US008380741B2

(12) United States Patent  (10) Patent No.: US 8,380,741 B2
Ishikawa et al.  (45) Date of Patent: Feb. 19, 2013

(54) TEXT MINING APPARATUS, TEXT MINING METHOD, AND COMPUTER-READABLE RECORDING MEDIUM

(75) Inventors: Kai Ishikawa, Tokyo (JP); Akihiro Tamura, Tokyo (JP); Shinichi Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/060,587

(22) PCT Filed: Aug. 28, 2009

(86) PCT No.: PCT/JP2009/004211
§ 371 (c)(1),
(2), (4) Date: Feb. 24, 2011

(87) PCT Pub. No.: WO2010/023939
PCT Pub. Date: Mar. 4, 2010

(65) Prior Publication Data
US 2011/0161367 A1  Jun. 30, 2011

(30) Foreign Application Priority Data

Aug. 29, 2008 (JP) .................................. 2008-222455

(51) Int. Cl.
*G06F 17/30* (2006.01)
(52) U.S. Cl. ................................................ 707/776
(58) Field of Classification Search .................. 707/776
See application file for complete search history.

(56) References Cited

U.S. PATENT DOCUMENTS

| 6,185,527 B1 * | 2/2001 | Petkovic et al. ............. 704/231 |
| 2002/0178002 A1 * | 11/2002 | Boguraev et al. ............. 704/235 |
| 2003/0028566 A1 * | 2/2003 | Nakano ......................... 707/538 |
| 2004/0158558 A1 * | 8/2004 | Koizumi et al. ................. 707/3 |

(Continued)

FOREIGN PATENT DOCUMENTS

| JP | 2001101194 A | 4/2001 |
| JP | 2004164079 A | 6/2004 |

(Continued)

OTHER PUBLICATIONS

F. Wessel et al., "Confidence Measures for Large Vocabulary Continuous Speech Recognition," Mar. 2001, IEEE Trans. Speech and Audio Processing, vol. 9, No. 3, pp. 288-298.*

(Continued)

*Primary Examiner* — Apu Mofiz
*Assistant Examiner* — Dara J Glasser

(57) ABSTRACT

A text mining apparatus, a text mining method, and a program are provided that enable the influence that computer processing errors have on mining results to be reduced during text mining performed on a plurality of text data pieces including a text data piece generated by computer processing. A text mining apparatus 1 to be used includes an inherent portion extraction unit 6 that, for each of a plurality of text data pieces including a text data piece generated by computer processing, extracts an inherent portion of the text data piece relative to another of the text data pieces, an inherent confidence setting unit 7 that, for each inherent portion of each of the text data pieces, sets inherent confidence indicating confidence of the inherent portion, using the confidence that has been set for each of the text data pieces, and a mining processing unit 8 that performs text mining on each inherent portion of each of the text data pieces, using the inherent confidence.

12 Claims, 13 Drawing Sheets

U.S. PATENT DOCUMENTS

2005/0283357 A1* 12/2005 MacLennan et al. ............. 704/4
2006/0206306 A1* 9/2006 Cao et al. .......................... 704/4

FOREIGN PATENT DOCUMENTS

| JP | 2007026347 A | 2/2007 |
|----|--------------|--------|
| JP | 2008039983 A | 2/2008 |
| WO | 2007066704 A | 6/2007 |
| WO | 2007138872 A | 12/2007 |

OTHER PUBLICATIONS

International Search Report for PCT/JP2009/004211 mailed Nov. 2, 2009.

H. Li et al., "Mining from Open Answers in Questionnaire Data", In Proceedings of the Seventh ACM SIGKDD International Conference on Knowledge Discovery and Data Mining, 2001, pp. 443-449.

F. Wessel et al., "Confidence Measures for Large Vocabulary Continuous Speech Recognition", IEEE Trans. Speech and Audio Processing, vol. 9, No. 3, Mar. 2001, pp. 288-298.

J. F. Pitrelli et al., "Confidence-Scoring Post-Processing for Off-Line Handwritten-Character Recognition Verification", In Proceedings of the Seventh International Conference on Document Analysis and Recognition (ICDAR), vol. 1, Aug. 2003, pp. 278-282.

* cited by examiner

FIG. 2

| Call audio data | Call memo text data | Supplementary information |
|---|---|---|
| A : Thank you for calling. This is the Telephone Shopping Center. My name is Yamada.<br>B : Well, I just called because I saw your ads and liked the design of one of the electric pots. I'd like the electric pot that can boil water the most quickly in your ads.<br>A : I see. Then, I recommend that you buy the MP32 model.<br>B : Does it have a heat-retaining function?<br>A : No, it just has a boiling function.<br>B : Well, I think that would be fine as long as it can boil water the most quickly.<br>A : What color would you like? We have three colors, yellow, blue, and green.<br>B : I'd like white. Do you have a white color?<br>A : No, we don't. I'm sorry.<br>B : Well, then I choose yellow.<br>A : Thank you very much. Then, may I have your name and address?<br>B : · · · · ·<br>A : · · · · · | · She liked the design of our electric pots.<br><br>· Introduced MP32 because she wants the model that can boil water the most quickly.<br><br>· Explained the absence of heat-retaining function in MP32.<br><br>· Selected color is yellow.<br><br>· We need to consider a future increase in color variations.<br><br>· We also need to consider new addition of heat-retaining function. | [Identification]<br>0 8 0 8 3 3 3<br>[Operator]<br>Taro Yamada<br>[Customer name]<br>Hanako Suzuki<br>[Customer address]<br>· · · · ·<br>[Ordered product]<br>M P 3 2 - Y<br>[Form of payment]<br>· · · · · |

FIG. 4
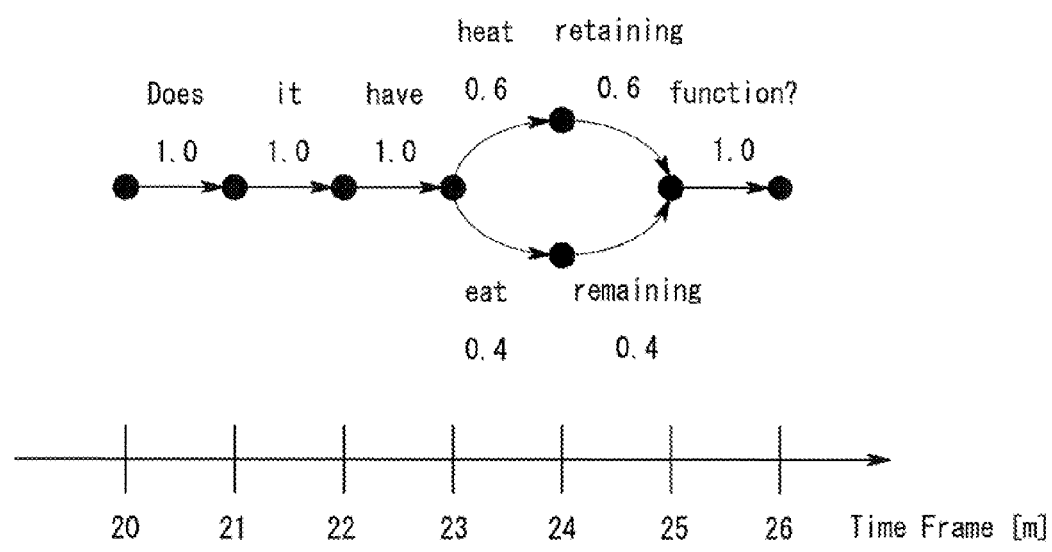
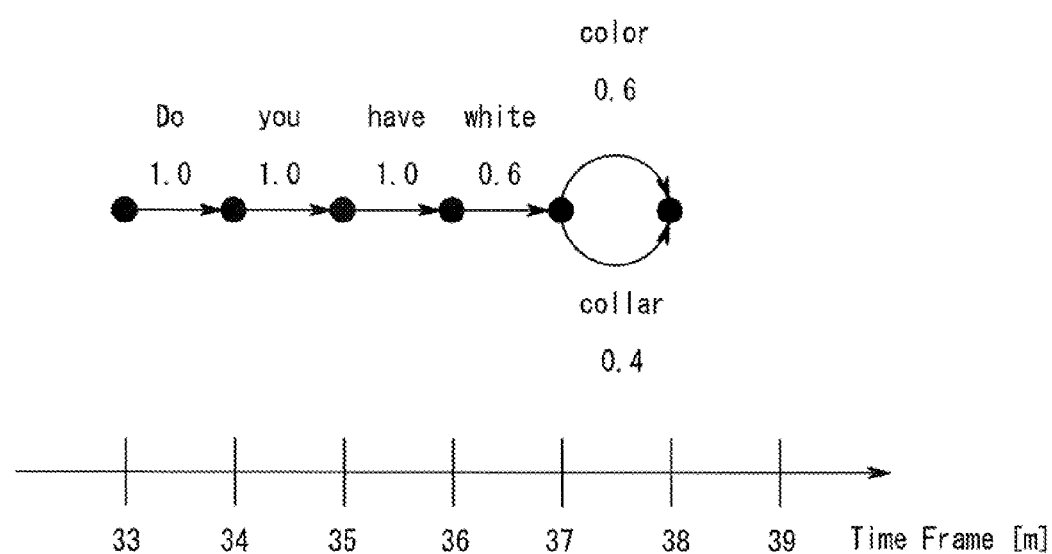

FIG. 5

| Record | Speech-recognized text data | Call memo text data | Inherent portion (speech recognition) ○ or × | Inherent portion (call memo) ○ or × |
|---|---|---|---|---|
| 1 | White — | Color | ○ — | ○ |
| 2 | White — | White | × — | × |
| 3 | Color White | White | ○ × | × |
| ⋮ | ⋮ | | | |

FIG. 6

| Speech-recognized text data | |
|---|---|
| Inherent portion element $w_i$ | Inherent confidence $C_{Call}(w_i)$ |
| Ads | 0.8 |
| White | 0.4 |

| Call memo text data | |
|---|---|
| Inherent portion element $w_j$ | Inherent confidence $C_{Memo}(w_j)$ |
| Future | 1 |
| Color variations | 1 |
| Increase | 1 |
| New | 1 |
| Addition | 1 |
| Consider | 1 |

Fig. 7

| Speech-recognized text data | | | | |
|---|---|---|---|---|
| Feature word | Frequency of appearance | Total frequency of appearance | Inherent confidence | Feature level |
| Ads | 1 1 | 1 2 | 0. 8 | 0. 1 5 |
| White | 1 5 | 1 8 | 0. 4 | 0. 1 7 |
| ~~Black~~ | — | — | ~~0. 3~~ | — |
| · | · | · | · | · |
| · | · | · | · | · |
| · | · | · | · | · |

| Call memo text data | | | | |
|---|---|---|---|---|
| Feature word | Frequency of appearance | Total frequency of appearance | Inherent confidence | Feature level |
| Future | 1 0 | 1 2 | 1 | 0. 1 4 |
| Color variations | 8 | 1 1 | 1 | 0. 2 0 |
| Increase | 8 | 1 0 | 1 | 0. 2 0 |
| New | 6 | 8 | 1 | 0. 0 9 |
| Addition | 7 | 7 | 1 | 0. 0 6 |
| Consider | 5 | 5 | 1 | 0. 3 5 |

Fig. 10

| Speech-recognized text data | | Call memo text data | |
| --- | --- | --- | --- |
| Word $w_i$ | Score $S_{Call}(w_i, l)$ | Word $w_j$ | Score $S_{Memo}(w_j, l)$ |
| Ads | 0.745 | | |
| Saw | 0.174 | | |
| Electric pots | 0.006 | Electric pots | 0.010 |
| Design | 0.048 | Design | 0.070 |
| Liked | 0.023 | Liked | 0.030 |
| Water | 0.032 | | |
| Boil | 0.036 | Boil | 0.040 |
| Most | 0.047 | Most | 0.060 |
| Quickly | 0.137 | Quickly | 0.020 |
| Like | 0.046 | Like | 0.030 |
| Heat-retaining | 0.125 | Heat-retaining | 0.080 |
| Function | 0.015 | Function | 0.020 |
| Has | 0.062 | | |
| White | 0.862 | | |
| Like | 0.026 | | |
| Have | 0.004 | Have | 0.010 |
| Color | 0.036 | Color | 0.050 |
| Yellow | 0.041 | Yellow | 0.060 |
| | | Future | 0.800 |
| | | Color variations | 0.800 |
| | | Increase | 0.800 |
| | | New | 0.800 |
| | | Addition | 0.800 |
| | | Consider | 0.800 |

TEXT MINING APPARATUS, TEXT MINING METHOD, AND COMPUTER-READABLE RECORDING MEDIUM

The present application is the National Phase of PCT/JP2009/004211, filed Aug. 28, 2009, which claims priority based on Japanese patent application No. 2008-222455 filed on Aug. 29, 2008.

TECHNICAL FIELD

The present invention relates to a text mining apparatus and a text mining method using text data obtained by computer processing as a target for mining.

BACKGROUND ART

In recent years, text mining has been attracting attention as technology for extracting useful information from huge amounts of text data. Text mining is the process of dividing a collection of non-standardized text into words or phrases with use of natural language analysis methods and extracting feature words. The frequencies of appearance of the feature words and their correlations are then analyzed to provide the analyst with useful information. Text mining enables analysis of huge amounts of text data that has been impossible to achieve with manpower.

One exemplary application area for such text mining is free-response format questionnaires. In this case, text mining is performed on text data obtained by typing responses to a questionnaire or recognizing characters therein (see PTLs 1 and 2 and NPL 1, for example). Using the results of the text mining, the analyst is able to perform various analyses and verification of hypotheses.

Another exemplary application area for text mining is company call centers. Call centers accumulate a huge volume of audio obtained by recording calls between customers and operators, and a huge amount of memos created by operators with key entry or the like when answering calls. Such information has become an important knowledge source in recent years for companies to get to know consumer needs, what should be improved in their own products and services, and so on.

Text mining, when applied to call centers, is performed on either text data obtained by speech recognition of calls (speech-recognized text data) or text data obtained from call memos created by operators (call memo text data). Which text data is to undergo text mining is determined depending on the viewpoint of the analysis required by the analyst.

For example, the speech-recognized text data covers all calls between operators and consumers. Thus, when the purpose is to extract consumer requests for products and services, text mining is performed on the speech-recognized text data because in that case the utterances of all consumers need to be covered.

Meanwhile, the call memo text data covers a narrower range, but it includes matters determined as important by operators during calls and furthermore matters recognized or determined as necessary to record by operators who took cues from the contents of calls. Accordingly, text mining is performed on the call memo text data in cases where analyses are required to focus on additional information about operators, such as where information to be extracted is, for example, decision know-how of experienced operators that should be shared with other operators, or erroneous decisions made by newly-hired operators.

The speech-recognized text data, however, contains recognition errors in most cases. For this reason, when performing text mining on the speech-recognized text data, feature words may not be extracted precisely due to the influence of possible recognition errors. In order to solve this problem, it has been proposed (see PTL 3, for example) that text mining be performed using speech-recognized text data in which confidence has been assigned to each word candidate obtained by speech recognition (see NPL 2, for example). In the text mining described in PTL 3, correction based on the confidence is performed when the number of extracted feature words is counted, and accordingly the influence of recognition errors is reduced.

Now, the speech-recognized text data and the call memo text data mentioned in the above example of a call center are information obtained from the same event (telephone call) via different channels. Both pieces of information are obtained via different channels but have the same information source. Accordingly, it is conceivable that if text mining is performed making use of the characteristics of both information and using both information complementarily, more complex analysis would be possible than in the case where text mining is performed on only one of the text data pieces, or simply on each text data piece separately.

Specifically, the speech-recognized text data is first divided into portions that are common to the call memo text data, and portions that are inherent in call audio and are not described in the call memo text data. Similarly, the call memo text data is divided into portions common to the speech-recognized text data and portions that are inherent in call memos and not described in the speech-recognized text data.

Then, text mining is performed on the portions of the speech-recognized text data that are inherent in call audio. This text mining puts emphasis on the analysis of information that appears in call audio but is not included in the description of call memos. Through this analysis, information that should have been recorded as call memos but has been left out is extracted. Such extracted information can be used to improve description guidelines for creating call memos.

Subsequently, text mining is performed on the portions of the call memo text data that are inherent in call memos. This text mining puts emphasis on the analysis of information that appears in call memos but does not appear in the speech-recognized text data of call audio. Through this analysis, decision know-how of experienced operators is extracted more reliably than in the above-described case where text mining is performed on the call memo text data only. Such extracted decision know-how can be utilized as educational materials for newly-hired operators.

The above text mining performed on a plurality of text data pieces obtained from the same event via different channels (hereinafter referred to as "cross-channel text mining") can also be used in other examples.

For instance, cross-channel text mining is usable in cases where the perception of a company is to be analyzed from reported content, and where conversations in communication settings such as meetings are to be analyzed. In the former case, text mining is performed on speech-recognized text data generated from the utterances of announcers or the like and on text data such as speech drafts or newspaper articles. In the latter case, text mining is performed on speech-recognized text data obtained by speech recognition of conversations among participants and on text data such as documents referred to by participants in situ, memos created by participants, and minutes of meetings.

Also, in cross-channel text mining, a target for mining does not necessarily need to be speech-recognized text data or text data created with key entry. A target for mining may, for example, be character-recognized text data obtained by character recognition of questionnaires, minutes of meetings or the like as mentioned above (see NPL 3).

Furthermore, it is important, when performing cross-channel text mining, to clearly divide common portions and inherent portions of one text data piece relative to another text data piece. This is because analysis accuracy will decrease significantly if such division is unclear.

Citation List

Patent Literature

PTL 1: JP 2001-101194A
PTL 2: JP 2004-164079A
PTL 3: JP 2008-039983A

Non Patent Literature

NPL 1: H. Li and K. Yamanishi, "Mining from Open Answers in Questionnaire Data", In Proceedings of the Seventh ACM SIGKDD International Conference on Knowledge Discovery and Data Mining, pp. 443-449, 2001

NPL 2: Frank Wessel, et. al. "Confidence Measures for Large Vocabulary Continuous Speech Recognition", IEEE Trans. Speech and Audio Processing, vol. 9, No. 3, March 2001, pp. 288-298

NPL 3: John F. Pitrelli, Michael P. Perrone, "Confidence-Scoring Post-Processing for Off-Line Handwritten-Character Recognition Verification", In Proceedings of the Seventh International Conference on Document Analysis and Recognition (ICDAR), vol. 1, August 2003, pp. 278-282

SUMMARY OF INVENTION

Problem to be Solved by the Invention

Text data pieces generated by computer processing such as speech recognition or character recognition, however, contain errors in most cases. For example, speech-recognized text data contains recognition errors as described above. In particular, in the case of cross-channel text mining, such errors may significantly reduce confidence in mining results because they affect the process of discrimination between common portions and inherent portions in text data pieces.

Also, although PTL 3 above discloses a technique for reducing the influence of speech recognition errors on text mining if there is such influence as described above, this technique does not take into consideration the application to cross-channel text mining. Even if the technique disclosed in PTL 3 is applied to cross-channel text mining, it is difficult to improve confidence in mining results because the influence that recognition errors have on the process of discrimination between common portions and inherent portions in text data pieces is not eliminated.

It is an object of the present invention to solve the above-described problems and provide a text mining apparatus, a text mining method, and a computer-readable recording medium for reducing the influence that computer processing errors have on mining results during text mining performed on a plurality of text data pieces including a text data piece generated by computer processing.

Means for Solving Problem

In order to achieve the above object, a text mining apparatus according to the present invention is a text mining apparatus for performing text mining using, as targets, a plurality of text data pieces including a text data piece generated by computer processing, confidence being set for each of the text data pieces, the text mining apparatus including an inherent portion extraction unit that, for each of the text data pieces, extracts an inherent portion of the text data piece relative to another of the text data pieces, an inherent confidence setting unit that, for each inherent portion of each of the text data pieces relative to another of the text data pieces, sets inherent confidence that indicates confidence of the inherent portion, using the confidence that has been set for each of the text data pieces, and a mining processing unit that performs text mining on each inherent portion of each of the text data pieces relative to another of the text data pieces, using the inherent confidence.

Also, in order to achieve the above object, a text mining method according to the present invention is a text mining method for performing text mining using, as targets, a plurality of text data pieces including a text data piece generated by computer processing, the text mining method including the steps of (a) setting confidence for each of the text data pieces, (b) for each of the text data pieces, extracting an inherent portion of the text data piece relative to another of the text data pieces, (c) for each inherent portion of each of the text data pieces relative to another of the text data pieces, setting inherent confidence that indicates confidence of the inherent portion, using the confidence that has been set for each of the text data pieces, and (d) performing text mining on each inherent portion of each of the text data pieces relative to another of the text data pieces, using the inherent confidence.

Furthermore, in order to achieve the above object, a computer-readable recording medium according to the present invention is a computer-readable recording medium that records a program for causing a computer device to perform text mining using, as targets, a plurality of text data pieces including a text data piece generated by computer processing, the program including instructions that cause the computer device to perform the steps of (a) setting confidence for each of the text data pieces, (b) for each of the text data pieces, extracting an inherent portion of the text data piece relative to another of the text data pieces, (c) for each inherent portion of each of the text data pieces relative to another of the text data pieces, setting inherent confidence that indicates confidence of the inherent portion, using the confidence that has been set for each of the text data pieces, and (d) performing text mining on each inherent portion of each of the text data pieces relative to another of the text data pieces, using the inherent confidence.

Effects of the Invention

With the above-described features, it is possible, according to the present invention, to reduce the influence that computer processing errors have on mining results during text mining performed on a plurality of text data pieces including a text data piece generated by computer processing.

BRIEF DESCRIPTION OF DRAWINGS

FIG. 2 is a diagram showing an example of data pieces targeted for text mining according to Exemplary Embodiment 1 of the present invention.

FIG. 4 is a diagram showing an example of speech-recognized text data whose confidence has been set, in the case where the language is English.

FIG. 5 is a diagram illustrating processing for extracting inherent portions performed by the text mining apparatus according to Exemplary Embodiment 1 of the present invention.

FIG. 6 is a diagram showing an example situation where inherent confidence has been set.

FIG. 7 is a diagram showing an example of the results of text mining processing.

FIG. 10 is a diagram showing an example of inherent portions extracted by the text mining apparatus according to Exemplary Embodiment 2 of the present invention.

DESCRIPTION OF THE INVENTION

Exemplary Embodiment 1

Below is a description of a text mining apparatus, a text mining method, and a program according to Exemplary Embodiment 1 of the present invention with reference to FIGS. 1 to 8. First, a description is given of the configuration of the text mining apparatus according to Exemplary Embodiment 1 of the present invention with reference to FIGS. 1 to 7.

Figure 1:
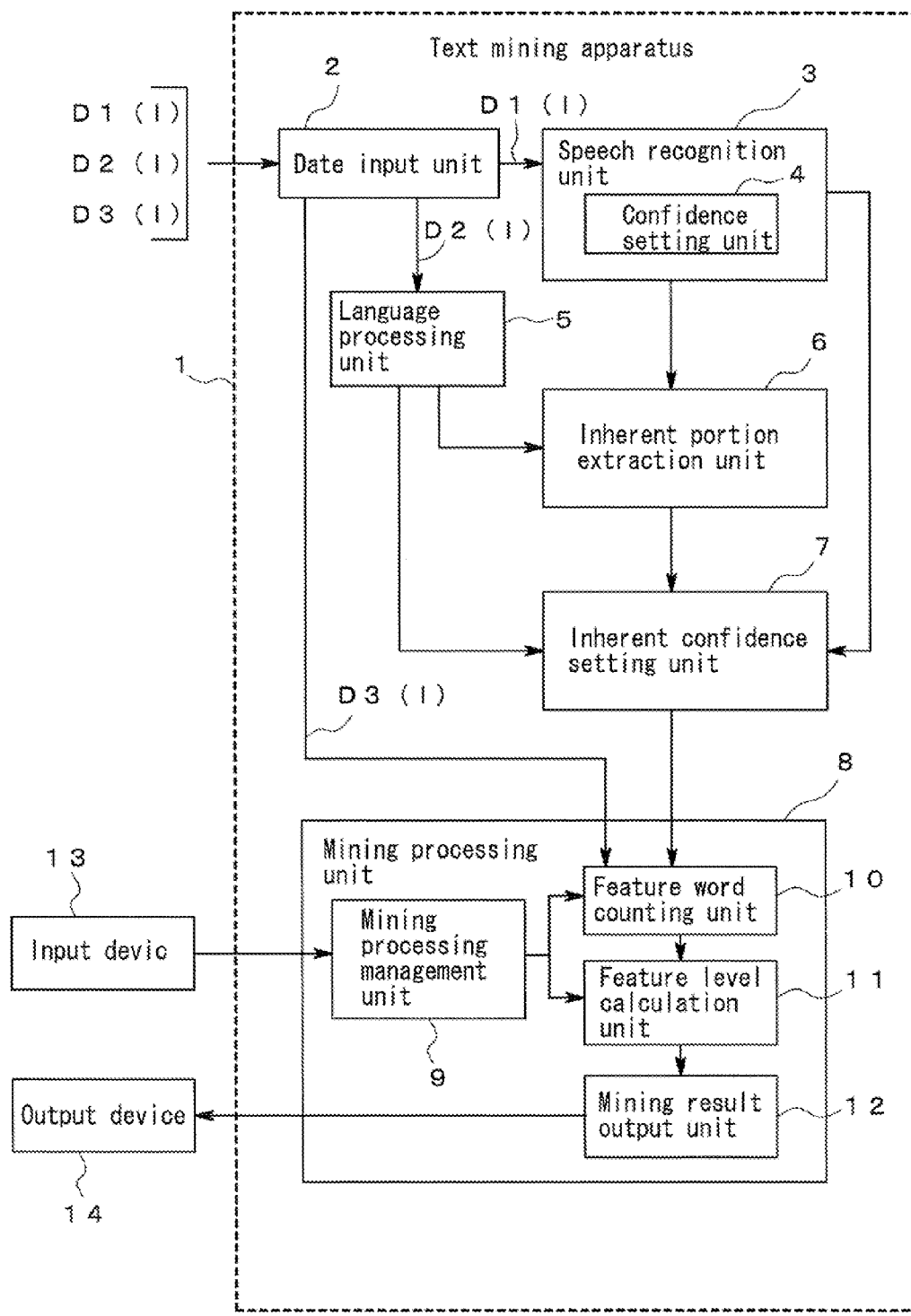
FIG. 1 is a block diagram showing a schematic configuration of a text mining apparatus according to Exemplary Embodiment 1 of the present invention.
Figure 3:
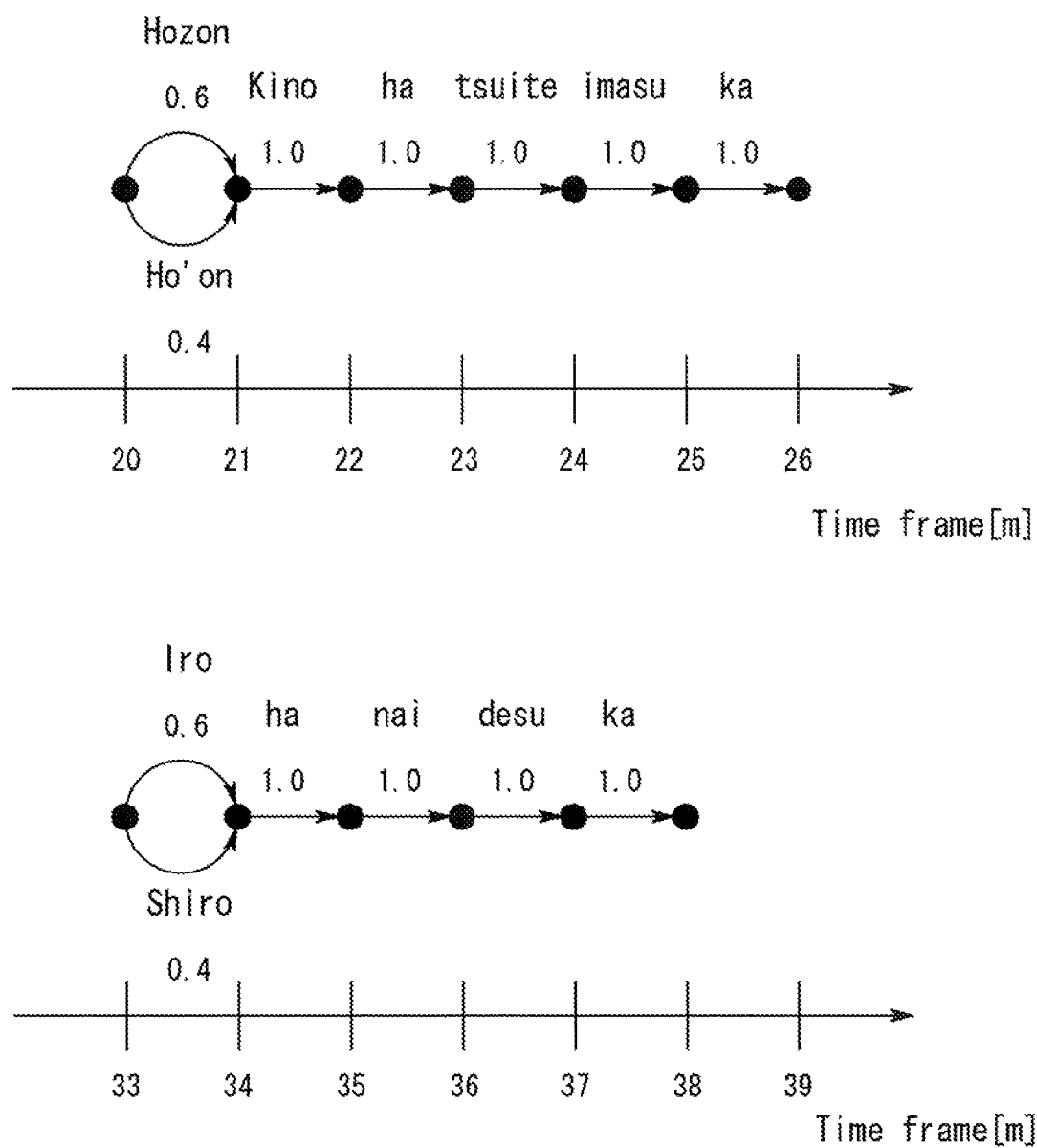
FIG. 3 is a diagram showing an example of speech-recognized text data whose confidence has been set.

FIG. 1 is a block diagram showing a schematic configuration of a text mining apparatus according to Exemplary Embodiment 1 of the present invention. FIG. 2 is a diagram showing an example of data pieces targeted for text mining according to Exemplary Embodiment 1 of the present invention. FIG. 3 is a diagram showing an example of speech-recognized text data whose confidence has been set. FIG. 4 is a diagram showing an example of speech-recognized text data whose confidence has been set in the case where the language is English. FIG. 5 is a diagram illustrating processing for extracting inherent portions performed by the text mining apparatus according to Exemplary Embodiment 1 of the present invention. FIG. 6 is a diagram showing an example situation where inherent confidence has been set. FIG. 7 is a diagram showing an example of the results of text mining processing.

A text mining apparatus 1 shown in FIG. 1 performs text mining using, as targets, a plurality of text data pieces including a text data piece generated by computer processing. As shown in FIG. 1, the text mining apparatus 1 includes an inherent portion extraction unit 6, an inherent confidence setting unit 7, and a mining processing unit 8.

Confidence has been set for each of the text data pieces. The term "confidence" as used herein refers to the degree of appropriateness of words constituting text data. Accordingly, "confidence" of, for example, text data generated by computer processing is an index of whether words constituting the text data are correct as the results of computer processing.

The inherent portion extraction unit 6 extracts an inherent portion of each of a plurality of text data pieces relative to the others. Here, the "inherent portion of each text data piece relative to the others" as used herein refers to a word or phrase in the text data piece that is not at all or just a little included in the other text data pieces.

The inherent confidence setting unit 7 sets inherent confidence indicating confidence of each inherent portion of each text data piece relative to the others, using the confidence set for each of the text data pieces. The mining processing unit 8 performs text mining on each inherent portion of each text data piece relative to the others, using the inherent confidence.

In this way, the text mining apparatus 1 sets the inherent confidence indicating confidence of each inherent portion of each text data piece. The inherent confidence is obtained based on the confidence set for each text data piece and thus becomes an index of whether the inherent portion is correct as the result of computer processing. This inherent confidence is referenced during text mining processing.

The text mining apparatus 1 can thus simply eliminate the influence of computer processing errors from mining results. As a result, highly reliable mining results less affected by computer processing errors are obtained.

Note that the term "computer processing" as used in the present invention refers to analysis processing performed by a computer in accordance with a certain algorithm. Also, "text data obtained by computer processing" as used herein refers to text data automatically generated by computer processing. Specific examples of such computer processing include speech recognition processing, character recognition processing, and machine translation processing.

Following is a more detailed description of the configuration of the text mining apparatus 1. Also, the below description is given of an example where the text mining apparatus 1 is applied to a call center. In Exemplary Embodiment 1, targets for mining are text data obtained by speech recognition (computer processing) of call audio data D1 recorded at the call center (see FIG. 2), and call memo text data D2 (see FIG. 2).

As shown in FIG. 1, the text mining apparatus 1 receives three types of data inputs, namely the call audio data D1, the call memo text data D2, and supplementary information D3, as shown in FIG. 2. The call audio data D1 is audio data obtained by recording conversations between operators and customers at the call center. In FIG. 2, "A" indicates the operator and "B" the customer.

The call memo text data D2 is text data created as memos by operators during calls, and it is not text data obtained by computer processing. The supplementary information D3 is data attached to the call audio data D1 and the call memo text data D2, and only part thereof is shown in FIG. 2. The supplementary information D3 is primarily used to calculate a feature level discussed later.

A call between an operator and a customer from the start to the end is treated as a single unit (single record) of the call audio data D1, and the call memo text data D2 and the supplementary information D3 are generated one piece each per record. FIG. 2 shows a single record of call audio data D1, call memo text data D2 corresponding thereto, and supplementary information D3 corresponding thereto. In practice, the call audio data D1($l$) for a single record with record number l, the call memo text data D2($l$) corresponding thereto, and the supplementary information D3($l$) corresponding thereto are grouped as one set, and the text mining apparatus 1 receives an input of a plurality of such sets. Note that in the below description, "l" is a natural number from 1 to L (l=1, 2, ..., L).

As shown in FIG. 1, the text mining apparatus 1 also includes a data input unit 2, a speech recognition unit 3, and a language processing unit 5, in addition to the inherent portion extraction unit 6, the inherent confidence setting unit 7, and the mining processing unit 8.

The text mining apparatus 1 is further connected to an input device 13 and an output device 14. Specific examples of the input device 13 include a keyboard and a mouse. Specific examples of the output device 14 include a display device, such as a liquid crystal display, and a printer. Alternatively, the input device 13 and the output device 14 may be installed on another computer device connected to the text mining apparatus 1 via a network.

First, input data including the call audio data D1(*l*) for each record l, the corresponding call memo text data D2(*l*), and the corresponding supplementary information D3(*l*) is input to the data input unit 2. At this time, the data may be input directly to the data input unit 2 from an external computer device via the network, or may be provided in a form stored in a recording medium. In the former case, the data input unit 2 is an interface for connecting the text mining apparatus 1 to external equipment. In the latter case, the data input unit 2 is a reader.

Upon receiving an input of the data, the data input unit 2 outputs the call audio data D1(*l*) to the speech recognition unit 3 and the call memo text data D2(*l*) to the language processing unit 5. The data input unit 2 also outputs the supplementary information D3(*l*) to the mining processing unit 8.

The speech recognition unit 3 performs speech recognition on the call audio data D1(*l*) so as to generate speech-recognized text data. The speech recognition unit 3 includes a confidence setting unit 4. The confidence setting unit 4 sets confidence for each word constituting the speech-recognized text data. The speech-recognized text data whose confidence has been set is output to the inherent portion extraction unit 6.

Now, a description is given of processing performed by the speech recognition unit 3 with reference to FIGS. 3 and 4, using a conversation included in the call audio data D1 shown in FIG. 2. From among many phrases in the conversation included in the call audio data D1, the phrases "Does it have heat retaining function?" and "Do you have white color" are to be used.

First, the speech recognition unit 3 performs speech recognition on the call audio data D1(*l*) for each record l. The speech recognition unit 3 then extracts a word $w_i$ as a candidate per time frame m as shown in FIG. 3. In FIG. 3, the numbers shown on the horizontal axis denote frame numbers, and serial frame numbers are used for a single record l.

If there are a plurality of candidates within the same time frame m, the speech recognition unit 3 extracts a plurality of words. In the example of FIG. 3, two candidates "hozon" ("storage") and "ho'on" ("heat-retaining") are extracted from the frame with frame number 20. Also, two candidates "iro" ("color") and "shiro" ("white") are extracted from the frame with frame number 33.

In the case where the language used in conversations is English, the speech recognition unit 3 similarly extracts a word $w_i$ as a candidate per time frame m. For example, in the case of using the English translation of the conversation used in the example of FIG. 3, that is, using the phrases "Does it have heat retaining function?" and "Do you have white color?", the speech recognition unit 3 extracts words $w_i$ as shown in FIG. 4.

In the example of FIG. 4, two candidates "heat retaining" and "eat remaining" are extracted from the frames with frame numbers 23 and 24, and two candidates "color" and "collar" are extracted from the frame with frame number 37. In FIG. 4 as well, the numbers shown on the horizontal axis denote frame numbers, and serial frame numbers are used for a single record 1.

Note that it is not necessary for the speech recognition unit 3 to extract all words as candidates. In the present exemplary embodiment, the speech recognition unit 3 is configured to extract only independent parts of speech such as nouns, verbs, and adverbs and not to extract words such as postpositional particles and prepositions that have no meaning by themselves, regardless of the type of language.

The confidence setting unit 4 sets confidence $R_{Call}(w_i, l, m)$ for each word $w_i$. In FIGS. 3 and 4, the numerical value from 0 to 1 written under each word represents confidence. Also, in the present exemplary embodiment, the confidence $R_{Call}(w_i, l, m)$ is not particularly limited to this, as long as it is an index of whether words constituting the speech-recognized text data are correct as the results of recognition.

For example, the confidence $R_{Call}(w_i, l, m)$ may be "confidence measures" as disclosed in NPL 2 above. Specifically, input audio or an acoustic feature quantity obtained from observation of the input audio is assumed to be given as a precondition. In this case, the confidence $R_{Call}(w_i, l, m)$ of a word $w_i$ can be calculated as the posterior probability of the word $w_i$ using a forward-backward algorithm, based on word graphs obtained as a result of recognition of the input audio or the acoustic feature quantity.

Furthermore, the confidence setting unit 4 calculates confidence Rea ($w_i$, l) for each record 1, using the confidence $R_{Call}(w_i, l, m)$ obtained as described above for each word $w_i$. Specifically, the confidence setting unit 4 performs calculation on all words $w_i$, using the following equation (Equation 1).

$$R_{Call}(w_i, l) = 1.0 - \prod_m (1.0 - R_{Call}(w_i, l, m)) \quad \text{[Equation 1]}$$

Alternatively, in Exemplary Embodiment 1, a mode is possible in which speech recognition is performed in advance by a speech recognition device outside the text mining apparatus 1, and speech-recognized text data in which confidence has been set for each word has already been created prior to input to the text mining apparatus 1. In this case, it is not necessary for the text mining apparatus 1 to include the speech recognition unit 3, and speech-recognized text data is input via the data input unit 2 to the inherent portion extraction unit 6. However, providing the speech recognition unit 3 in the text mining apparatus 1 facilitates control of language or acoustic models used in speech recognition, and accordingly improves speech recognition accuracy.

The language processing unit 5 performs language processing such as morphological analysis, dependency analysis, synonym processing, and unnecessary word processing on the call memo text data. The language processing unit 5 also generates a word sequence by dividing the call memo text data into words $w_j$ that correspond to words $w_i$ in the speech-recognized text data. The word sequence is output to the inherent portion extraction unit 6.

In Exemplary Embodiment 1, the inherent portion extraction unit 6 extracts an inherent portion of the speech-recognized text data relative to the call memo text data and an inherent portion of the call memo text data relative to the speech-recognized text data. Note that in the below description, those inherent portions are respectively referred to as the "inherent portion of the speech-recognized text data" and the "inherent portion of the call memo text data".

Also, in Exemplary Embodiment 1, the inherent portion extraction unit 6 firstly extracts, from a group of words constituting each text data piece, a word that does not match words constituting the other text data pieces. Then, the inherent portion extraction unit 6 determines the extracted word as an inherent portion of the text data piece relative to the others.

Specifically, as shown in FIG. 5, for example referring to record 1, the speech-recognized text data obtained from the call audio data D1(1) includes the word "white", whereas the corresponding call memo text data D2(1) does not include the word "white". In this case, the inherent portion extraction unit 6 extracts the word "white" as an inherent portion of the speech-recognized text data. Also referring to record 1, the speech-recognized text data obtained from the call audio data D1(1) does not include the word "color", whereas the corresponding call memo text data D2(1) includes the word "color". In this case, the inherent portion extraction unit 6 extracts the word "color" as an inherent portion of the call memo text data D2(1).

Meanwhile, as shown in FIG. 5, referring to record 2, both of the speech-recognized text data obtained from the call audio data D1(2) and the corresponding call memo text data D2(2) include the word "white". In this case, the inherent portion extraction unit 6 does not extract the word "white" as an inherent portion of either of the speech-recognized text data and the call memo text data.

Also, as shown in FIG. 5, referring to record 3, the speech-recognized text data obtained from the call audio data D1(3) includes two candidates "color" and "white" for the same frame number (see FIG. 3). The corresponding call memo text data D2(3) includes only the word "white". In this case, the inherent portion extraction unit 6 extracts the word "color" as an inherent portion of the speech-recognized text data, but does not extract the word "white" as an inherent portion of either of the speech-recognized text data and the call memo text data.

The inherent portions of the speech-recognized text data and the inherent portions of the call memo text data extracted in this way are input to the inherent confidence setting unit 7. Specifically, the words $w_i$ (hereinafter referred to as "inherent portion elements $w_i$") extracted as the inherent portions of the speech-recognized text data and the words $w_j$ (hereinafter referred to as "inherent portion elements $w_j$") extracted as the inherent portions of the call memo text data are input to the inherent confidence setting unit 7.

In Exemplary Embodiment 1, the inherent confidence setting unit 7 firstly sets confidence $R_{Memo}(w_j, I)$ for each word $w$; constituting the call memo text data, using the word sequence output from the language processing unit 5. In this case, since the call memo text data has been generated by operators with key entry, the confidence of words included in the call memo text data is set to 1.0. Note that confidence for words not included in the call memo text data is set to 0.0.

Subsequently, the inherent confidence setting unit 7 sets inherent confidence $C_{Call}(w_i, I)$ for the inherent portion elements $w_i$ and inherent confidence $C_{Memo}(w_j, I)$ for the inherent portion elements $w_j$. Specifically, the inherent confidence setting unit 7 applies the confidence $R_{Call}(w_i, I)$, the confidence $R_{Memo}(w_j, I)$, confidence $R_{Call}(w_j, I)$, and confidence $R_{Memo}(w_i, I)$ to the following equations (Equations 2 and 3).

Here, the confidence $R_{Call}(w_j, I)$ shows confidence set for the same word in the speech-recognized text data as a word $w_j$ included in the call memo text data. Accordingly, if the speech-recognized text data includes no word that is the same as a word $w_j$, the confidence $R_{Call}(w_j, I)$ is calculated as 0. Also, the confidence $R_{Memo}(w_i, I)$ shows confidence set for the same word in the call memo text data as a word $w_i$ included in the speech-recognized text data. Similarly to the above, if the call memo text data includes no word that is the same as a word $w_i$, the confidence $R_{Memo}(w_i, I)$ is calculated as 0.

As a result, the inherent confidence $C_{Call}(w_i, I)$ and the inherent confidence $C_{Memo}(w_j, I)$ are calculated as shown in FIG. 6, for example. The inherent confidence $C_{Call}(w_i, I)$ and the inherent confidence $C_{Memo}(w_j, I)$ calculated in this way are input to the mining processing unit 8, together with the inherent portion elements $w_i$ and the inherent portion elements $w_j$.

$$C_{Call}(w_i,I)=R_{Call}(w_i,I)\cdot[1.0-R_{Memo}(w_i,I)] \qquad [\text{Equation 2}]$$

$$C_{Memo}(w_j,I)=R_{Memo}(w_j,I)\cdot[1.0-R_{Call}(w_j,I)] \qquad [\text{Equation 3}]$$

In this way, in Exemplary Embodiment 1, when setting the inherent confidence for an inherent portion of one text data piece, the inherent confidence setting unit 7 multiplies the confidence set for the one text data piece by a value obtained by subtracting the confidence set for the other text data piece from one. The inherent confidence obtained in this way has the advantage of being easy to set and presenting reliable confidence of each inherent portion.

In Exemplary Embodiment 1, the mining processing unit 8 performs so-called cross-channel text mining, using the inherent confidence $C_{Call}(w_i, I)$ and the inherent confidence $C_{Memo}(w_j, I)$. That is, the mining processing unit 8 performs mining processing on the inherent portion elements $w_i$ and mining processing on the inherent portion elements $w_j$.

Specifically, in Exemplary Embodiment 1, the mining processing unit 8 extracts feature words and calculates feature levels thereof as mining processing. The term "feature word" as used herein refers to a word or phrase extracted by mining processing. For example, a feature word is extracted from the words determined as the inherent portion elements $w_i$ or the inherent portion elements $w_j$. The "feature level" shows the degree of how much the extracted feature word is distinctive in terms of an arbitrary category (a collection of records having a specific value in the supplementary information D3, for example).

In order to perform the above processing, the mining processing unit 8 includes a mining processing management unit 8, a feature word counting unit 10, a feature level calculation unit 11, and a mining result output unit 12. The feature word counting unit 10 extracts a feature word from the inherent portion elements $w_i$ and the inherent portion elements $w_j$ and counts the number of times the extracted feature word appears in corresponding text data or in all text data. Through this, the frequency of appearance and the total frequency of appearance are obtained (see FIG. 7).

Specifically, the feature word counting unit 10 extracts a feature word using the inherent confidence $C_{Call}(w_i, I)$ and the inherent confidence $C_{Memo}(w_j, I)$. 1). For example, a threshold value is set for inherent confidence, and only an inherent portion element whose inherent confidence is greater than or equal to the threshold value is extracted as a feature word. In the example of FIG. 7, the threshold value is set to 0.4 and accordingly the inherent portion element "black" whose inherent confidence has been set to 0.3 is excluded from feature words.

In Exemplary Embodiment 1, although the threshold value may be set as appropriate, it is preferable that experiments be conducted in advance and a threshold value be set based on experimental results. Specifically, the inherent confidence $C_{Call}(w_i, I)$ and the inherent confidence $C_{Memo}(w_j, I)$ are calculated with the above-mentioned procedure, using audio data whose inherent portions have been preset and text data whose inherent portions have been preset as well. Then, a threshold value is set so that the preset inherent portions of each data are to be extracted. In this case, the threshold value can be set for each type of inherent confidence. It is also preferable that as much experimental data as possible be prepared in order to increase confidence of the threshold value that is set.

Also, the feature word counting unit 10 is capable of counting the number of feature words for a plurality of records. In the present exemplary embodiment, the number of records targeted for the counting of feature words is not particularly limited. Note that, in the case where cross-channel mining is not performed, the feature word counting unit 10 counts the frequencies of appearance of all words (excluding meaningless words) included in the speech-recognized text data or the call memo text data, instead of inherent portion elements.

The feature level calculation unit 11 calculates the feature level (see FIG. 7), using the frequency of appearance and the total frequency of appearance obtained by the feature word counting unit 10. The method for calculating the feature level is not particularly limited, and a variety of statistical analysis techniques may be used depending on the purpose of mining or the like.

Specifically, the feature word calculation unit 11 can calculate a statistical measure such as the frequency of appearance, a log-likelihood ratio, a $\chi^2$ value, a Yates correction $\chi^2$ value, point-wise mutual information, SE, or ESC as a feature quantity of each word in a specific category, and determine the calculated value as a feature level. Note that an example of the specific category includes a collection of records having a specific value designated by the analyst in the supplementary information D3, as mentioned above. Also, statistical analysis technology such as multiple regression analysis, principal component analysis, factor analysis, discriminant analysis, or cluster analysis may be used for the calculation of the feature level.

The mining processing management unit 8 also receives mining conditions input by the user via the input device 13 and causes the feature word counting unit 10 and the feature level calculation unit 11 to operate in accordance with the received conditions. For example, in the case where the user has given an instruction to perform text mining on only inherent portions of the speech-recognized text data, the mining processing management unit 8 causes the feature word counting unit 10 to extract feature words from the inherent portion elements $w_i$ of the speech-recognized text data and count the number of feature words. The mining processing management unit 8 also causes the feature level calculation unit 11 to calculate the feature levels.

The mining result output unit 12 outputs mining results as shown in FIG. 7 to the output device 14. In FIG. 7, the mining results include the feature word, the frequency of appearance, the total frequency of appearance, the inherent confidence, and the feature level. In the present exemplary embodiment, since cross-channel text mining is performed, mining results for both of the speech-recognized text data and the call memo text data are output. When the output device 14 is a display device, mining results are displayed on the display screen.

Figure 8:
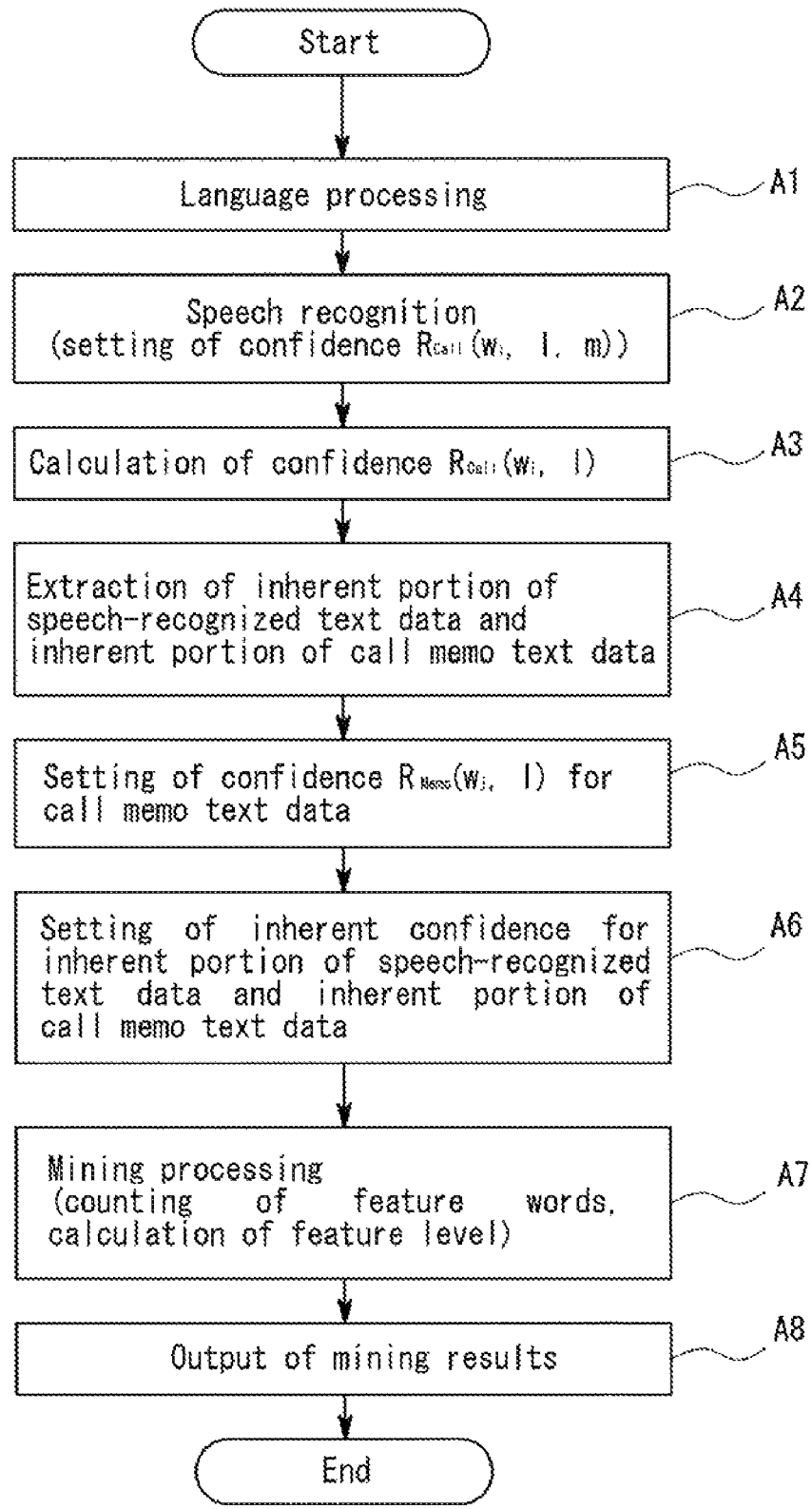
FIG. 8 is a flowchart showing a procedure of processing performed in accordance with a text mining method according to Exemplary Embodiment 1 of the present invention.

Next is a description of the text mining method according to Exemplary Embodiment 1 of the present invention with reference to FIG. 8. FIG. 8 is a flowchart showing a procedure of processing performed in accordance with the text mining method according to Exemplary Embodiment 1 of the present invention.

The text mining method according to Exemplary Embodiment 1 is implemented by causing the text mining apparatus 1 shown in FIG. 1 to operate. Therefore, the below description of the text mining method in Exemplary Embodiment 1 is given along with a description of the operation of the text mining apparatus 1 shown in FIG. 1 with reference to FIGS. 1 to 7 where appropriate.

First, the data input unit 2 of the text mining apparatus 1 receives an input of call audio data D1($l$), call memo text data D2($l$), and supplementary information D3($l$) for each of records (1) to (L). At this time, the call audio data D1($l$), the call memo text data D2($l$), and the supplementary information D3($l$) for each record $l$ ($l$=1, 2, ..., L) with the same record number are grouped into one set, and are input one set at a time.

Accordingly, the language processing unit 5 performs language processing on the call memo text data as shown in FIG. 8 (step A1). As a result of step A1, the call memo text data is transformed into a word sequence of words $w_j$ and is output to the inherent portion extraction unit 6 and the inherent confidence setting unit 7 in the form of the word sequence.

Then, the speech recognition unit 3 performs speech recognition and extracts words $w_i$ as candidates so as to generate speech-recognized text data (step A2). Also in step A2, the confidence setting unit 4 sets confidence $R_{Call}$ ($w_i$, 1, m) for each word $w_i$ constituting the speech-recognized text data. The confidence setting unit 4 then applies the confidence $R_{Call}$ ($w_i$, 1, m) to the above-described equation (Equation 1) and calculates confidence $R_{Call}$ ($w_i$, 1) for each record l (step A3).

Note that steps A2 and A3 are omitted in the case where speech-recognized text data in which confidence has been set for each word has already been created prior to input to the text mining apparatus 1. Alternatively, steps A2 and A3 may be performed prior to or simultaneously with step A1.

Next, the inherent portion extraction unit 6 compares the words $w_i$ in the speech-recognized text data and the words $w_j$ in the call memo text data and extracts inherent portions (inherent portion elements $w_i$) of the speech-recognized text data and inherent portions (inherent portion elements $w_j$) of the call memo text data (step A4). The inherent portion extraction unit 6 also inputs the extracted inherent portion elements $w_i$ and $w_j$ to the inherent confidence setting unit 7.

Then, the inherent confidence setting unit 7 sets confidence $R_{Memo}$ ($w_j$, 1) for each word $w_j$ constituting the call memo text data D2($l$) for each record l, using the word sequence output from the language processing unit 5 (step A5). Subsequently, the inherent confidence setting unit 7 sets inherent confidence $C_{Call}$ ($w_i$, 1) for the inherent portion elements $w_i$ and inherent confidence $C_{Memo}$ ($w_j$, 1) for the inherent portion elements $w_j$ (step A6).

Specifically, the inherent confidence setting unit 7 applies the confidence $R_{Call}$ ($w_i$, 1) and the confidence $R_{Memo}$ ($w_j$, 1) to the above-described equations (Equations 2 and 3) and calculates the inherent confidence $C_{Call}$ ($w_i$, 1) and the inherent confidence $C_{Memo}$ ($w_j$, 1). The inherent confidence setting unit 7 inputs the inherent confidence $C_{Call}$ ($w_i$, 1) and the inherent confidence $C_{Memo}$ ($w_j$, 1) thus calculated to the feature word counting unit 10.

Then, the mining processing unit 8 performs mining processing (step A7). Specifically, the feature word counting unit 10 first extracts feature words from the inherent portion elements $w_i$ and the inherent portion elements $w_j$, using the inherent confidence $C_{Call}$ ($w_i$, 1) and the inherent confidence $C_{Memo}$ ($w_j$, 1). The feature word counting unit 10 furthermore counts the frequency of appearance and the total frequency of appearance for each feature word. Then, the feature word calculation unit 11 calculates the feature level of each extracted feature word. Through the execution of step A7, data as shown in FIG. 7 is obtained.

Thereafter, the mining result output device 12 outputs the results obtained in step A7 to the output device 12(step A8). After the execution of step A8, the text mining apparatus 1 ends the processing.

In this way, in the text mining method according to Exemplary Embodiment 1, mining processing is performed on inherent portions, using the inherent confidence set for each inherent portion of each text data piece. This minimizes the influence that recognition errors occurring during speech recognition have on mining results.

A program according to Exemplary Embodiment 1 may be any program as long as it includes instructions that cause a computer to execute steps A1 to A8 shown in FIG. 8. In this case, the text mining apparatus 1 is implemented by installing the program according to Exemplary Embodiment 1 on a computer and causing the computer to execute that program. Also, in this case, the central processing unit (CPU) of the computer functions as the speech recognition unit 3, the language processing unit 5, the inherent portion extraction unit 6, the inherent confidence setting unit 7, and the mining processing unit 8, and performs the processing of steps A1 to A8.

Furthermore, the program according to Exemplary Embodiment 1 is supplied via a network or in a state of being stored in a computer-readable recording medium such as an optical disc, a magnetic disk, a magneto-optical disk, a semiconductor memory, or a floppy disk.

Exemplary Embodiment 2

Figure 9:
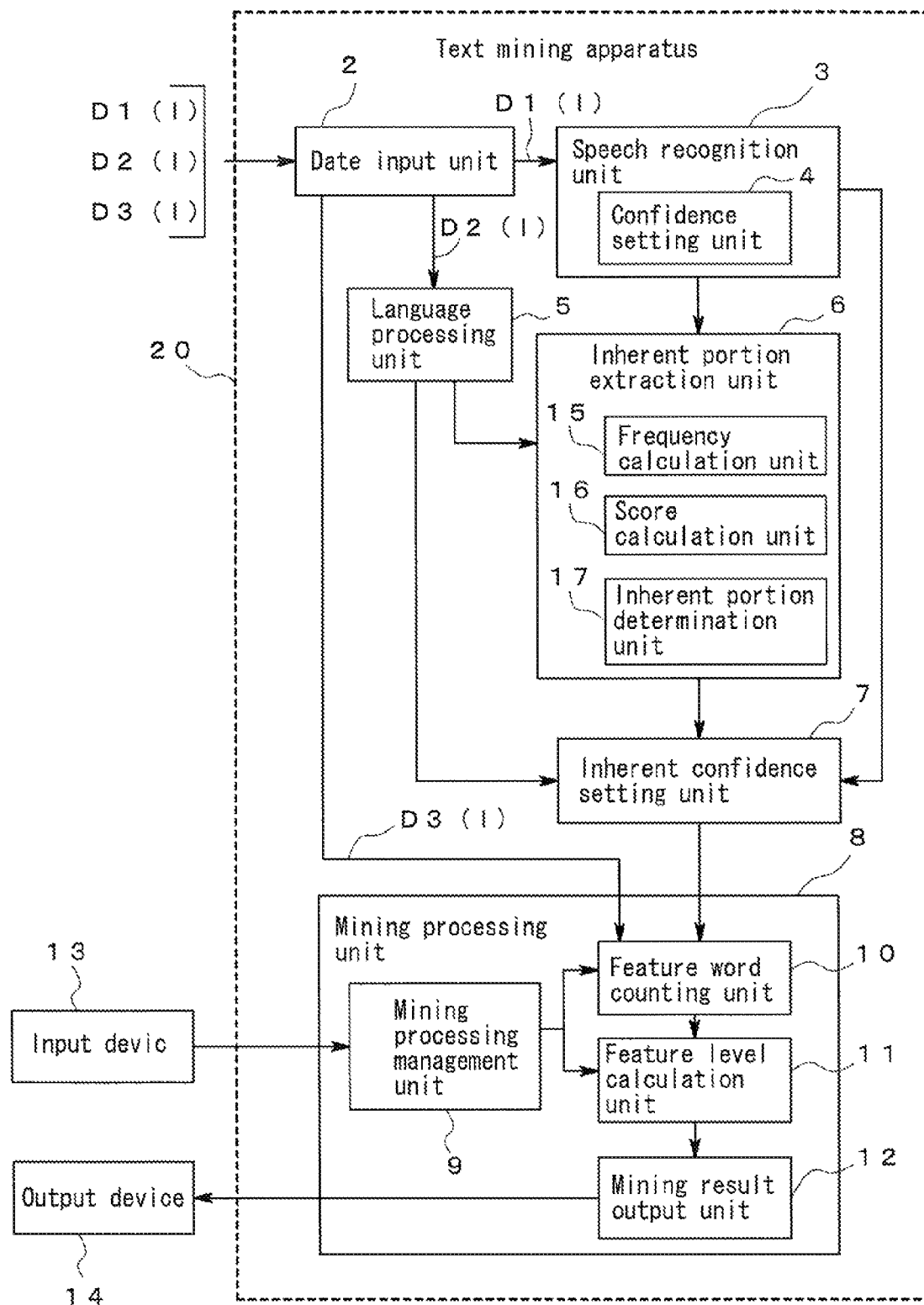
FIG. 9 is a block diagram showing a schematic configuration of a text mining apparatus according to Exemplary Embodiment 2 of the present invention.
Figure 11:
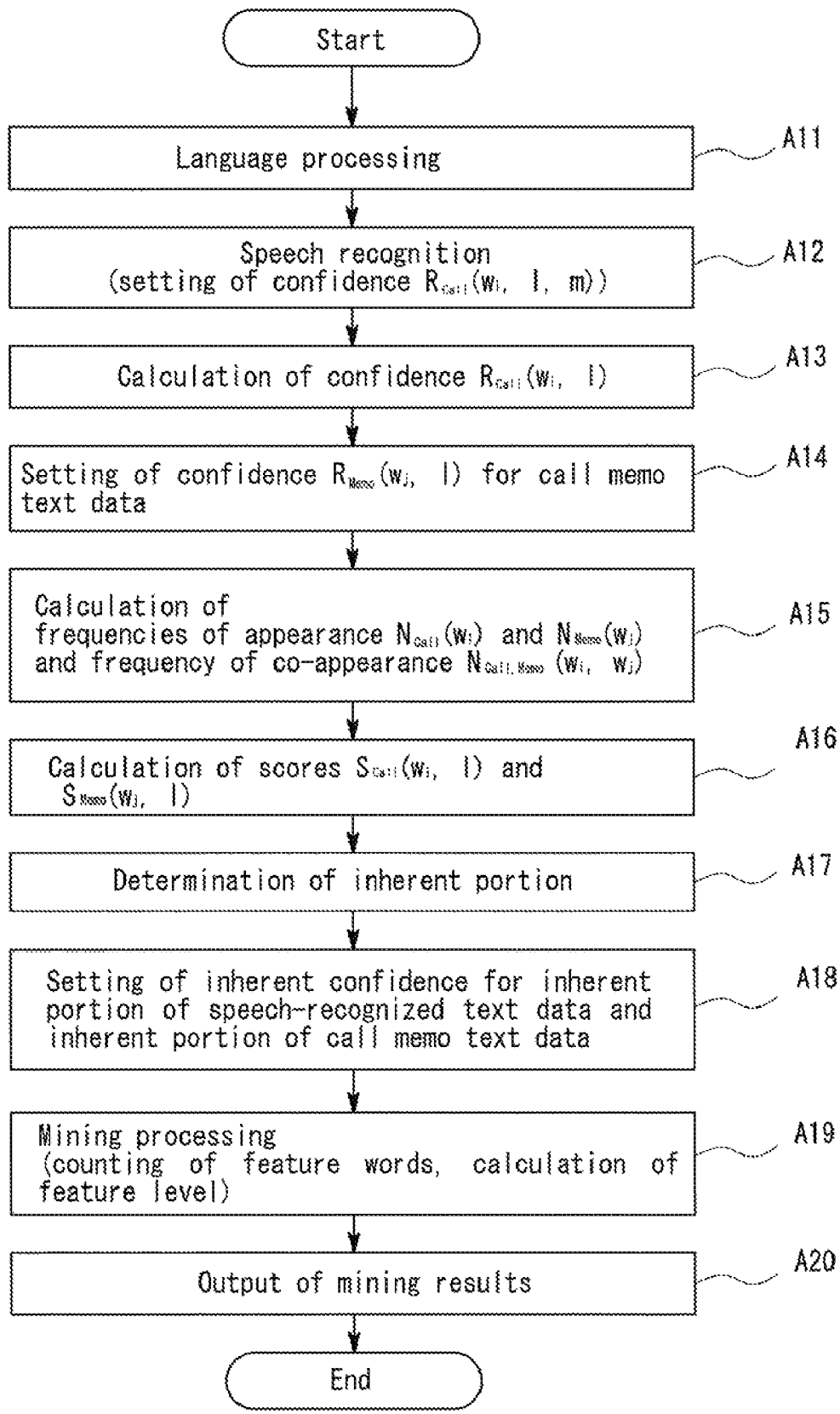
FIG. 11 is a flowchart showing a procedure of processing performed in accordance with a text mining method according to Exemplary Embodiment 2 of the present invention.

Next is a description of a text mining apparatus, a text mining method, and a program according to Exemplary Embodiment 2 of the present invention with reference to FIGS. 9 to 11. First, a description is given of the configuration of the text mining apparatus according to Exemplary Embodiment 2 of the present invention with reference to FIGS. 9 and 10. FIG. 9 is a block diagram showing a schematic configuration of the text mining apparatus according to Exemplary Embodiment 2 of the present invention. FIG. 10 is a diagram showing an example of inherent portions extracted by the text mining apparatus according to Exemplary Embodiment 2 of the present invention.

As shown in FIG. 9, a text mining apparatus 20 according to Exemplary Embodiment 2 differs from the text mining apparatus 1 in Exemplary Embodiment 1 shown in FIG. 1 in the configuration and function of the inherent portion extraction unit 6. In Exemplary Embodiment 2, inherent portions are determined more strictly than in Exemplary Embodiment 1. The following description focuses on differences from Exemplary Embodiment 1.

Note that the description of Exemplary Embodiment 2 is also given taking as an example the case where the text mining apparatus 20 is applied to a call center. The text mining apparatus 20 receives an input of records with record numbers 1 to L. Also, the call audio data D1($l$) for each record with record number l (l=1, 2, . . . , L), the call memo text data D2($l$) corresponding thereto, and the supplementary information D3($l$) likewise corresponding thereto are grouped as one set, and the text mining apparatus 20 receives an input of a plurality of such sets.

As shown in FIG. 9, in Exemplary Embodiment 2, the inherent portion extraction unit 6 calculates a score $S_{call}(w_i, l)$ or $S_{Memo}(w_j, l)$ for each word constituting each text data piece and extracts an inherent portion of each text data piece based on the calculated value. The score $S_{call}(w_i, l)$ shows the degree to which each word $w_i$ constituting speech-recognized text data corresponds to an inherent portion of the speech-recognized text data. The score $S_{Memo}(w_j, l)$ shows the degree to which each word $w_j$ constituting call memo text data corresponds to an inherent portion of the call memo text data.

In order to achieve the above function, the inherent portion extraction unit 6 includes a frequency calculation unit 15, a score calculation unit 16, and an inherent portion determination unit 17. The frequency calculation unit 15 sets confidence $R_{Memo}(w_j, l)$ for each word $w_j$ constituting the call memo text data, using the word sequence output from the language processing unit 5.

The confidence $R_{Memo}(w_j, l)$ set at this time is the same as the confidence $R_{Memo}(w_j, l)$ set by the inherent confidence setting unit 7 in Exemplary Embodiment 1. In Exemplary Embodiment 2, the confidence $R_{Memo}(w_j, l)$ is set by the frequency calculation unit 15 because it is necessary to calculate the score $S_{call}(w_i, l)$ or $S_{Memo}(w_j, l)$. The calculated confidence $R_{Memo}(w_j, l)$ is input to the inherent confidence setting unit 7 because it is also necessary to calculate inherent confidence.

Also, the frequency calculation unit 15 obtains the frequencies of appearance $N_{Call}(w_i)$ and $N_{Memo}(w_j)$ of respective words $w_i$ and $w_j$ from the confidence $R_{Memo}(w_j, l)$ and confidence $R_{Call}(w_i, l)$ that is set by the confidence setting unit 4. The frequency calculation unit 15 also obtains the frequencies of co-appearance $N_{Call, Memo}(w_i, w_j)$ of both words $w_i$ and $w_j$ for every record (records (1) to (L)), based on the confidence $R_{Call}(w_i, l)$ and the confidence $R_{Memo}(w_j, l)$.

Specifically, the frequency calculation unit 15 obtains the frequencies of appearance $N_{Call}(w_i)$ of words $w_i$ from the following equation (Equation 4) and the frequencies of appearance $N_{Memo}(w_j)$ of words $w_j$ from the following equation (Equation 5). The frequency calculation unit 15 also obtains the frequencies of co-appearance $N_{Call, Memo}(w_i, w_j)$ from the following equation (Equation 6). Thereafter, the frequency calculation unit 15 outputs the frequencies of appearance $N_{Call}(w_i)$, the frequencies of appearance $N_{Memo}(w_j)$, and the frequencies of co-appearance $N_{Call, Memo}(w_i, w_j)$ to the score calculation unit 16.

$$N_{Call}(w_i) = \sum_l R_{Call}(w_i, l) \qquad \text{[Equation 4]}$$

$$N_{Memo}(w_j) = \sum_l R_{Memo}(w_j, l) \qquad \text{[Equation 5]}$$

$$N_{Call,Memo}(w_i, w_j) = \sum_l R_{Call}(w_i, l) R_{Memo}(w_j, l) \qquad \text{[Equation 6]}$$

The score calculation unit 16 calculates the scores $S_{call}(w_i, l)$ and $S_{Memo}(w_j, l)$ described above, using the frequencies of appearance $N_{Call}(w_i)$, the frequencies of appearance $N_{Memo}(w_j)$, and the frequencies of co-appearance $N_{Call, Memo}(w_i, w_j)$. Specifically, the score calculation unit 16 firstly calculates mutual information amounts $I(w_i; w_j)$ where $w_i$ and $w_j$ are discrete random variables.

It is assumed herein that "L" is the total number of records that are targeted for the calculation of the frequencies of appearance $N_{Call}(w_i)$, the frequencies of appearance $N_{Memo}(w_j)$, and the frequencies of co-appearance $N_{Call, Memo}(w_i, w_j)$. Also, let $P_{Call, Memo}(w_i, w_j)$ be the joint distribution function of the mutual information amount $I(w_i; w_j)$. $P_{Call, Memo}(w_i, w_j)$ can be calculated from the following equation (Equation 7).

$$P_{Call,Memo}(w_i, w_j) = N_{Call,Memo}(w_i, w_j)/L \qquad \text{[Equation 7]}$$

It is obvious from the above equation (Equation 7) that $P_{Call, Memo}(w_i, w_j)$ is the joint distribution function of the probability event that a word $w_i$ will appear in speech-recognized text data Call and a word $w_j$ will appear in call memo text data Memo for a certain single record.

Also, let $P_{Call}(w_i)$ and $P_{Memo}(w_j)$ be the marginal probability distribution functions of the mutual information amount $I(w_i; w_j)$. $P_{Call}(w_i)$ is calculated from the following equation (Equation 8). $P_{Memo}(w_j)$ is calculated from the following equation (Equation 9).

$$P_{Call}(w_i) = N_{Call}(w_i)/L \quad \text{[Equation 8]}$$

$$P_{Memo}(w_j) = N_{Memo}(w_j)/L \quad \text{[Equation 9]}$$

It is obvious from the above equation (Equation 8) that $P_{Call}(w_i)$ is the marginal probability distribution function of the probability event that a word $w_i$ will appear in speech-recognized text data Call for a certain single record. It is also obvious from the above equation (Equation 9) that $P_{Memo}(w_j)$ is the marginal probability distribution function of the probability event that a word $w_j$ will appear in the call memo text data Memo for a certain single record.

Then, the mutual information amount $I(w_i; w_j)$ where $w_i$ and $w_j$ are discrete random variables can be calculated from the following equation (Equation 10).

$$I(w_i; w_j) = P_{Call,Memo}(w_i, w_j) \log \frac{P_{Call,Memo}(w_i, w_j)}{P_{Call}(w_i) P_{Memo}(w_j)} + [P_{Call}(w_i) - P_{Call,Memo}(w_i, w_j)] \log \frac{\left[ \begin{array}{c} P_{Call}(w_i) - \\ P_{Call,Memo}(w_i, w_j) \end{array} \right]}{P_{Call}(w_i)[1.0 - P_{Memo}(w_j)]} + [P_{Memo}(w_j) - P_{Call,Memo}(w_i, w_j)] \log \frac{\left[ \begin{array}{c} P_{Memo}(w_j) - \\ P_{Call,Memo}(w_i, w_j) \end{array} \right]}{[1.0 - P_{Call}(w_i)] P_{Memo}(w_j)} + [1.0 - P_{Call}(w_i) - P_{Memo}(w_j) + P_{Call,Memo}(w_i, w_j)] \log \frac{\left[ \begin{array}{c} 1.0 - P_{Call}(w_i) - P_{Memo}(w_j) + \\ P_{Call,Memo}(w_i, w_j) \end{array} \right]}{[1.0 - P_{Call}(w_i)][1.0 - P_{Memo}(w_j)]} \quad \text{[Equation 10]}$$

Next, the score calculation unit 16 calculates the scores $S_{call}(w_i, l)$ and $S_{Memo}(w_j, l)$ using the mutual information amounts $I(w_i; w_j)$. In the present exemplary embodiment, the scores $S_{call}(w_i, l)$ and $S_{Memo}(w_j, l)$ are functions that decrease monotonically relative to the mutual information amount $I(w_i; w_j)$. Specifically, the score $S_{call}(w_i, l)$ is calculated from the following equation (Equation 11), and the score $S_{Memo}(w_j, l)$ is calculated from the following equation (Equation 12). Note that in Equations 11 and 12, $\beta$ is an arbitrary constant greater than zero. The calculated scores $S_{call}(w_i, l)$ and $S_{Memo}(w_j, l)$ are output to the inherent portion determination unit 17.

$$S_{Call}(w_i, l) = \exp\left[-\beta \sum_{w_j \in Memo(l)} I(w_i; w_j)\right] \quad \text{[Equation 11]}$$

$$S_{Memo}(w_j, l) = \exp\left[-\beta \sum_{w_i \in Call(l)} I(w_i; w_j)\right] \quad \text{[Equation 12]}$$

The scores calculated in this way vary depending on the confidence values set for the speech-recognized text data and the call memo text data. In other words, the scores vary depending on recognition errors that may occur during speech recognition.

Note that in the present exemplary embodiment, the method for calculating the scores $S_{call}(w_i, l)$ and $S_{Memo}(w_j, l)$ is not limited to the calculation method described above. It is sufficient to use any method in which the scores $S_{call}(w_i, l)$ and $S_{Memo}(w_j, l)$ can be used to determine inherent portions.

The inherent portion determination unit 17 compares the scores $S_{call}(w_i, l)$ and $S_{Memo}(w_j, l)$ with preset threshold values and determines whether or not corresponding words are inherent portions. In the present exemplary embodiment, the inherent portion determination unit 17 determines each word as an inherent portion when the score of that word is greater than or equal to a threshold value. For example, it is assumed, as shown in FIG. 10, that scores are calculated for both of words $w_i$ constituting the speech-recognized text data and words $w_j$ constituting the call memo text data, and threshold values for both of the scores $S_{call}(w_i, l)$ and $S_{Memo}(w_j, l)$ are set to 0.500.

In this case, the inherent portion determination unit 17 extracts the words "ads" and "white" as inherent portions of the speech-recognized text data. The inherent portion determination unit 17 also extracts the words "future", "color variations", "increase", "new", "addition", and "consider" as inherent portions of the call memo text data.

In Exemplary Embodiment 2, the magnitude of the threshold values used to determine inherent portions is not particularly limited, and may be selected as appropriate based on the results of text mining processing. It is, however, preferable in cross-channel text mining that experiments be conducted in advance and threshold values be set based on experimental results in order to obtain favorable results.

Specifically, the threshold values in this case can be set in the same manner as in setting the threshold value of the inherent confidence in Exemplary Embodiment 1. That is, the scores $S_{call}(w_i, l)$ and $S_{Memo}(w_j, l)$ are calculated with the aforementioned procedure, using audio data whose inherent portions have been preset and text data whose inherent portions have likewise been preset as experimental data. Then, the threshold values are set so that the preset inherent portions of each data piece are to be extracted. In this case, the threshold value can be set for each type of score. It is also preferable that as much experimental data as possible be prepared in order to increase confidence of the threshold values that is set.

Then, the inherent portion determination unit 17 inputs the words $w_i$ (inherent portion elements $w_i$) determined as the inherent portions of the speech-recognized text data and the words $w_j$ (inherent portion elements $w_j$) determined as the inherent portions of the call memo text data to the inherent confidence setting unit 7. Note that the inherent confidence setting unit 7 functions in the same way as in Exemplary Embodiment 1, except when performing the process of setting the confidence $R_{Memo}(w_j, l)$, and sets inherent confidence $C_{Call}(w_i, l)$ or inherent confidence $C_{Memo}(w_j, l)$ for each inherent portion. The mining processing unit 8 also functions in the same way as in Exemplary Embodiment 1 and performs mining.

Next is a description of the text mining method according to Exemplary Embodiment 2 of the present invention with reference to FIG. 11. FIG. 11 is a flowchart showing a procedure of processing performed in accordance with the text mining method according to Exemplary Embodiment 2 of the present invention.

The text mining method according to Exemplary Embodiment 2 is implemented by causing the text mining apparatus 20 shown in FIG. 9 to operate. Therefore, the below description of the text mining method according to Exemplary Embodiment 2 is given along with a description of the operation of the text mining apparatus 20 shown in FIG. 9 with reference to FIGS. 9 and 10 where appropriate.

First, the data input unit 2 of the text mining apparatus 20 receives an input of call audio data D1($l$), call memo text data D2($l$), and supplementary information D3($l$) for each of records (1) to (L). At this time, the call audio data D1($l$), the call memo text data D2($l$), and the supplementary information D3($l$) for each record l (l=1, 2, ..., L) with the same record number are grouped into one set, and are input one set at a time.

Accordingly, the language processing unit 5 performs language processing (step A11), the speech recognition unit 3 performs speech recognition (step A12), and the confidence setting unit 4 calculates the confidence $R_{Call}(w_i, l)$ (step A13) as shown in FIG. 11. Steps A11 to A13 are the same as steps A1 to A3 shown in FIG. 8 in Exemplary Embodiment 1.

Next, in Exemplary Embodiment 2, the frequency calculation unit 15 sets the confidence $R_{Memo}(w_j, l)$ for each word $w_j$ constituting the call memo text data, using the word sequence output from the language processing unit 5 (step A14). Note that step A14 is performed with the same procedure as in step A5 shown in FIG. 8 in Exemplary Embodiment 1.

Subsequently, the frequency calculation unit 15 obtains the frequencies of appearance $N_{Call}(w_i)$ and $N_{Memo}(w_j)$ of respective words $w_i$ and $w_j$ and the frequencies of co-appearance $N_{Call, Memo}(w_i, w_j)$ of the words $w_i$ and $w_j$ for every record (records (1) to (L)), based on the confidence $R_{Call}(w_i, l)$ of the words $w_i$ and the confidence $R_{Memo}(w_j, l)$ of the words $w_j$ (step A15). The above equations (Equations 4 to 6) are used in step A15.

Then, after the processing by the frequency calculation unit 15 (steps A14 and A15) has been completed, the score calculation unit 16 calculates the scores $S_{call}(w_i, l)$ and $S_{Memo}(w_j, l)$, based on the frequencies of appearance $N_{Call}(w_i)$ and $N_{Memo}(w_j)$ and the frequencies of co-appearance $N_{Call, Memo}(w_i, w_j)$ (step A16). The calculation of the scores $S_{call}(w_i, l)$ and $S_{Memo}(w_j, l)$ is performed for each of the records (1) to (L). Specifically, the score calculation unit 16 calculates the mutual information amounts l ($w_i, w_j$) using the above equations (Equations 7 to 10) and applies the mutual information amounts l ($w_i, w_j$) to the above equations (Equations 11 and 12) as described above. As a result of step A16, data as shown in FIG. 10 is obtained.

Then, the inherent portion determination unit 17 determines whether or not the scores $S_{call}(w_i, l)$ and $S_{Memo}(w_j, l)$ of the respective words for each of the records (1) to (L) is greater than or equal to the preset threshold values, and determines those words whose scores are greater than or equal to the threshold values as inherent portions (step A17). Such information that specifies words determined as inherent portions in step Al 7 is transmitted to the inherent confidence setting unit 7.

Then, the inherent confidence setting unit 7 sets the inherent confidence $C_{Call}(w_i, l)$ and the inherent confidence $C_{Memo}(w_j, l)$ for the respective words that have been determined as inherent portions of the records (1) to (L) (step A18). Step A18 is the same as step A6 shown in FIG. 8 in Exemplary Embodiment 1.

Thereafter, the mining processing unit 8 performs mining processing (step A19), and the mining result output unit 12 outputs mining results (step A20). After the execution of step A20, the text mining apparatus 20 ends the processing.

In this way, according to Exemplary Embodiment 2, inherent portions are determined more strictly than in Exemplary Embodiment 1. This further increases confidence in mining results obtained by cross-channel mining. It is however noted that the use of Exemplary Embodiment 1 reduces the number of processes required to extract inherent portions and accordingly improves the processing speed of the entire text mining apparatus.

A program according to Exemplary Embodiment 2 may be any program as long as it includes instructions that cause a computer to execute steps A11 to A20 shown in FIG. 11. In this case, the text mining apparatus 20 is implemented by installing the program according to Exemplary Embodiment 2 on a computer and causing the computer to execute that program. Furthermore, in this case, the central processing unit (CPU) of the computer functions as the speech recognition unit 3, the language processing unit 5, the inherent portion extraction unit 6, and the mining processing unit 8, and performs processing of steps A11 to A20.

Also, the program according to Exemplary Embodiment 2 is supplied via a network or in a state of being stored in a computer-readable recording medium such as an optical disc, a magnetic disk, a magneto-optical disk, a semiconductor memory, or a floppy disk.

Exemplary Embodiment 3

Figure 12:
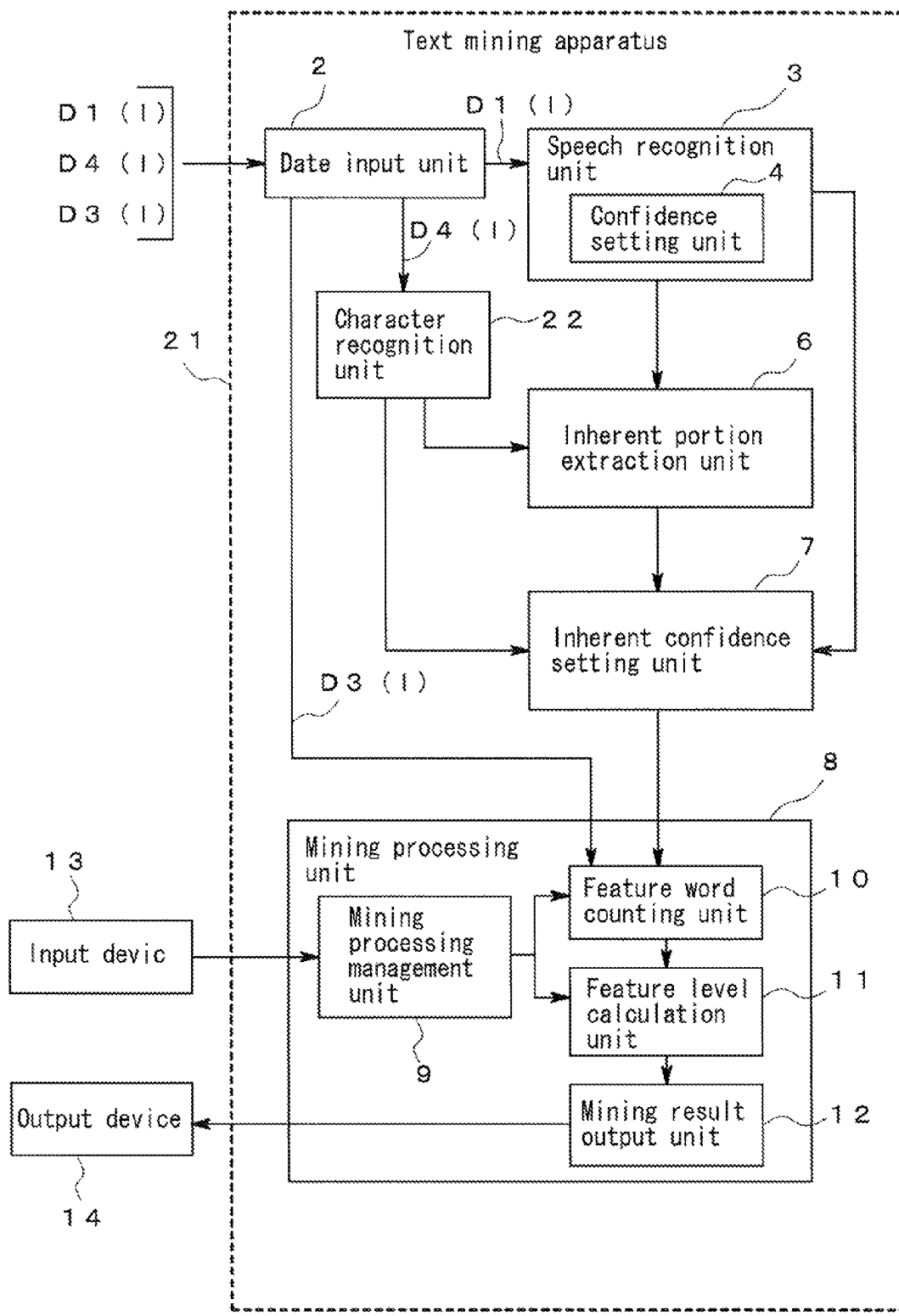
FIG. 12 is a block diagram showing a schematic configuration of a text mining apparatus according to Exemplary Embodiment 3 of the present invention.
Figure 13:
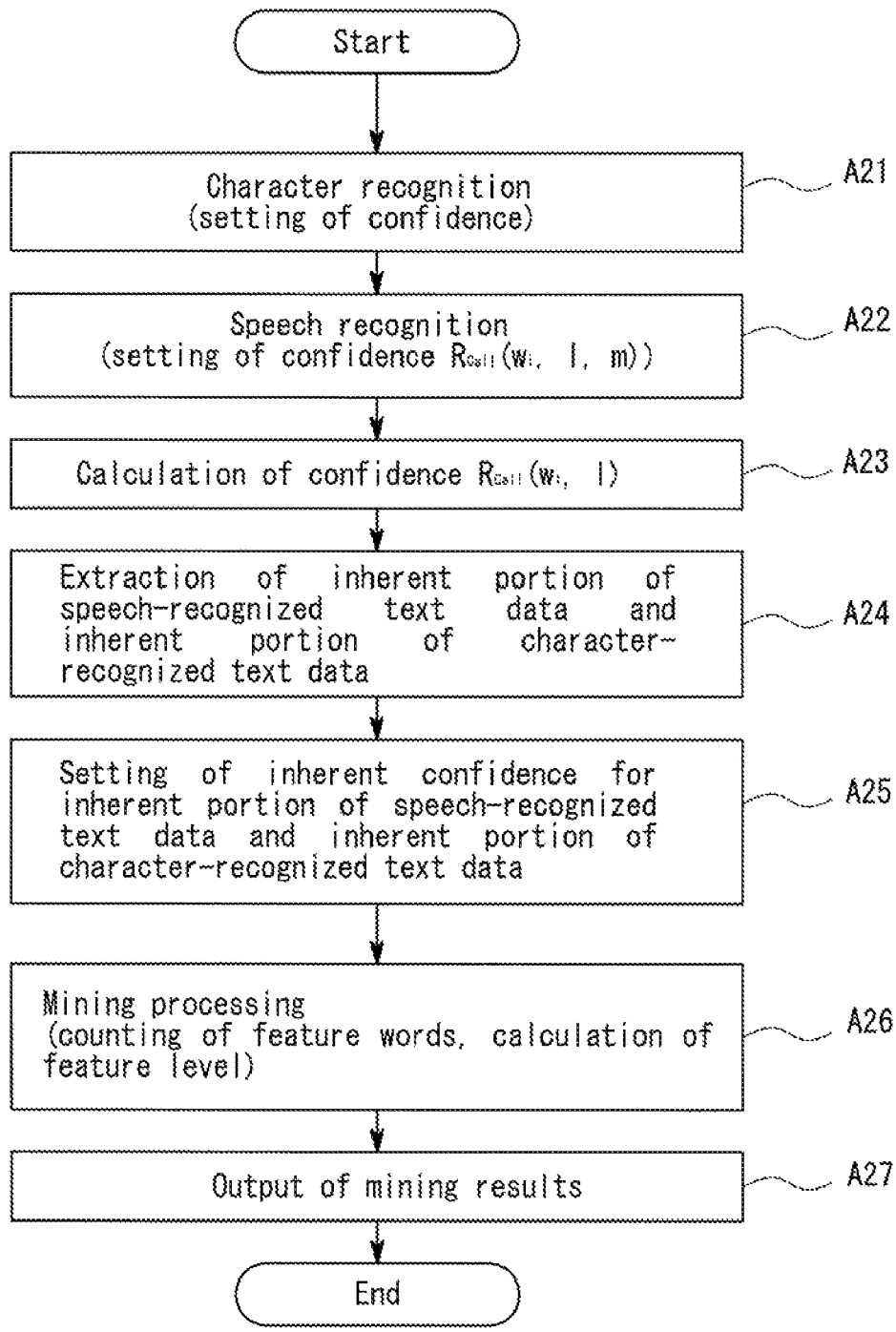
FIG. 13 is a flowchart showing a procedure of processing performed in accordance with a text mining method according to Exemplary Embodiment 3 of the present invention.

Next is a description of a text mining apparatus, a text mining method, and a program according to Exemplary Embodiment 3 of the present invention with reference to FIGS. 12 and 13. First, a description is given of the configuration of the text mining apparatus according to Exemplary Embodiment 3 of the present invention with reference to FIG. 12. FIG. 12 is a block diagram showing a schematic configuration of the text mining apparatus according to Exemplary Embodiment 3 of the present invention.

A text mining apparatus 21 shown in FIG. 12 uses speech-recognized text data and text data (character-recognized text data) obtained by character recognition as targets for mining. Therefore, the text mining apparatus 21 receives an input of document image data D4 that is output from an optical reader such as a scanner.

Note that in Exemplary Embodiment 3 as well, the text mining apparatus 21 receives an input of records with record numbers 1 to L. Also, call audio data D1($l$) for a record with record number 1 (l=1, 2, ..., L), image data D4($l$) corresponding thereto, and supplementary information D3($l$) likewise corresponding thereto are grouped into one set, and the text mining apparatus 20 receives an input of a plurality of such sets.

As shown in FIG. 12, the text mining apparatus 21 includes a character recognition unit 22, instead of the language processing unit 5 shown in FIG. 1 in Exemplary Embodiment 1, in order to perform character recognition on document image data D4($l$) for each record 1.

Similarly to Exemplary Embodiment 1, the text mining apparatus 21 in Exemplary Embodiment 3 is applied to a call center. Examples of a document as a source of image data D4($l$) for each record 1 include hand-written memos created by operators and facsimiles sent from customers.

The character recognition unit 22 performs character recognition on the image data D4($l$) for each record 1 and generates character-recognized text data for each record 1. The character recognition unit 22 also extracts words constituting the character-recognized text data and sets confidence for each of the words. It is sufficient that the confidence in this case is an index of whether the word constituting the character-recognized text data is correct as a result of recognition of an input image.

Specifically, the confidence for each word in the character-recognized text data may be the posterior probability of the word in the case where input image data D4(*l*) or a feature quantity of character recognition observed from the input image data D4(*l*) has been given. More specifically, the posterior probability in this case may be an "estimated posterior probability" disclosed in NPL 3 above.

Note that the text mining apparatus 21 has the same configuration as the text mining apparatus 1 shown in FIG. 1, except the parts described above. Accordingly, the data input unit 2, the speech recognition unit 3, the inherent portion extraction unit 6, the inherent confidence setting unit 7, and the mining processing unit 8 function similarly to those described in the example of Exemplary Embodiment 1. In Exemplary Embodiment 3, the speech-recognized text data and the character-recognized text data are used to extract inherent portions and set inherent confidence, and thereafter cross-channel mining is performed.

Alternatively, in Exemplary Embodiment 3, a mode is possible in which character recognition is performed by a character recognition device outside the text mining apparatus 21, and character-recognized text data in which confidence has been set for each word has already been created prior to input to the text mining apparatus 21. In this case, it is not necessary for the text mining apparatus 21 to include the character recognition unit 22, and character-recognized text data is input via the data input unit 2 to the inherent portion extraction unit 6.

Next is a description of the text mining method according to Exemplary Embodiment 3 of the present invention with reference to FIG. 13. FIG. 13 is a flowchart showing a procedure of processing performed in accordance with the text mining method according to Exemplary Embodiment 3 of the present invention.

The text mining method according to Exemplary Embodiment 3 is implemented by causing the text mining apparatus 21 shown in FIG. 12 to operate. Therefore, the below description of the text mining method according to Exemplary Embodiment 3 is given along with a description of the operation of the text mining apparatus 21 shown in FIG. 12 with reference to FIG. 12 where appropriate.

First, the data input unit 2 of the text mining apparatus 21 receives an input of call audio data D1(*l*), image data D4(*l*), and supplementary information D3(*l*) for each of records (1) to (L). At this time, the call audio data D1(*l*), the image data D4(*l*), and the supplementary information D3(*l*) for each record I (l=1, 2, ..., L) with the same record number are grouped into one set, and are input one set at a time.

Thus, as shown in FIG. 13, the character recognition unit 22 performs character recognition on the image data D4(*l*) for each record l (step A21). Through this, character-recognized text data is generated from the image data D4(*l*), and furthermore words $w_j$ constituting the character-recognized text data are extracted and confidence is set for each of the words $w_j$.

Next, the speech recognition unit 3 generates speech-recognized text data (step A22), and the confidence setting unit 4 calculates confidence $R_{Call}(w_i, l)$ (step A23). Steps A22 and A23 are the same as steps A2 and A3 shown in FIG. 8.

Note that step A21 will be omitted if character-recognized text data in which confidence has been set for each word has already been created prior to input to the text mining apparatus 21. Also, steps A22 and A23 will be omitted if speech-recognized text data in which confidence has been set for each word has already been created prior to input to the text mining apparatus 21. Alternatively, steps A22 and A23 may be performed prior to or simultaneously with step A21.

Then, the inherent portion extraction unit 6 extracts inherent portion elements $w_i$ and inherent portion elements $w_j$ (step A24). Subsequently, the inherent confidence setting unit 7 sets inherent confidence for the inherent portion elements $w_i$ and inherent confidence for the inherent portion elements $w_j$ (step A25). Steps A24 and A25 are the same as steps A4 and A6 shown in FIG. 8. However, in step A25, the confidence set in step A21 is used to set the inherent confidence.

Thereafter, the mining processing unit 8 performs mining processing (step A26), and the mining result output unit 12 outputs mining results (step A27). After the execution of step A27, the text mining apparatus 21 ends the processing.

In this way, in Exemplary Embodiment 3, the inherent confidence is set for the inherent portions of the speech-recognized text data and the inherent portions of the character-recognized text data. According to Exemplary Embodiment 3, it is possible, in the case where one of targets for mining is character-recognized text data, to reduce the influence that recognition errors occurring during character recognition have on mining results.

A program according to Exemplary Embodiment 3 may be any program as long as it includes instructions that cause a computer to execute steps A21 to A27 shown in FIG. 13. In this case, the text mining apparatus 21 is implemented by installing the program according to Exemplary Embodiment 3 on a computer and causing the computer to execute that program. Also, in this case, the central processing unit (CPU) of the computer functions as the speech recognition unit 3, the character recognition unit 22, the inherent portion extraction unit 6, and the mining processing unit 8, and performs processing of steps A21 to A27.

Also, the program according to Exemplary Embodiment 3 is supplied via a network or in a state of being stored in a computer-readable recording medium such as an optical disc, a magnetic disk, a magneto-optical disk, a semiconductor memory, or a floppy disk.

Although the examples where the text mining apparatus is applied to a call center have been shown in Exemplary Embodiments 1 to 3, example applications of the text mining apparatus are not limited thereto. The text mining apparatus is also applicable in cases such as where the perception of a company is to be analyzed based on content reported on TV or by radio, and where conversations in communication settings such as meetings are to be analyzed. In addition, although inherent portions are extracted from two pieces of text data in Exemplary Embodiments 1 to 3, the present invention is not intended to be limited thereto. For example, inherent portions may be extracted from three or more pieces of text data.

In the above Exemplary Embodiments 1 and 2, descriptions have been given of the examples in which a target for text mining is a set of speech-recognized text data that may include errors and call memo text data that includes no error. In the above Exemplary Embodiment 3, a description has been given of the example in which a target for text mining is a set of speech-recognized text data that may include errors and character-recognized text data that may include errors as well. The present invention is, however, not intended to be limited to those cases where targets are only the above-described combinations of text data, and text mining may be performed on data combinations other than the above-described combinations.

According to the present invention, inherent confidence is set for each inherent portion of a plurality of text data pieces, and text mining is performed based on the inherent confidence. Accordingly, besides the above-described combinations, other examples of a target for text mining include a set of speech-recognized text data corresponding to the call audio of an operator and speech-recognized text data corresponding to the call audio of a customer.

Furthermore, text data targeted for text mining may be text data other than speech-recognized text data, text data generated with key entry (call memo text data), and character-recognized text data. The present invention is applicable to even such text data as long as it is possible to extract words constituting the text data and further to set confidence for each of the words. Another specific example of such text data is text data obtained by mechanical translation.

Although the aspects of the present invention have been described with reference to Exemplary Embodiments 1 to 3, the present invention is not intended to be limited to Exemplary Embodiments 1 to 3 described above. It should be noted that various modifications that are understandable for those skilled in the art can be made to the configuration and details of the present invention within the scope of the present invention.

This application is based upon and claims the benefit of priority from Japanese Patent Application No. 2008-222455 filed on Aug. 29, 2008, the disclosure of which is incorporated herein in its entirety by reference.

A text mining apparatus, a text mining method, and a computer-readable recording medium according to the present invention have the following features.

(1) The text mining apparatus is for performing text mining using, as targets, a plurality of text data pieces including a text data piece generated by computer processing, confidence being set for each of the text data pieces, the text mining apparatus including an inherent portion extraction unit that, for each of the text data pieces, extracts an inherent portion of the text data piece relative to another of the text data pieces, an inherent confidence setting unit that, for each inherent portion of each of the text data pieces relative to another of the text data pieces, sets inherent confidence that indicates confidence of the inherent portion, using the confidence that has been set for each of the text data pieces, and a mining processing unit that performs text mining on each inherent portion of each of the text data pieces relative to another of the text data pieces, using the inherent confidence.

(2) With the text mining apparatus described in the above (1), a numerical value less than or equal to one is set as the confidence for each of the text data pieces, and in a case of setting the inherent confidence for each inherent portion of one of the text data pieces relative to another of the text data pieces, the inherent confidence setting unit sets the inherent confidence by multiplying the confidence that has been set for the one text data piece by a value obtained by subtracting the confidence that has been set for the other text data piece from one.

(3) With the text mining apparatus described in the above (1), the inherent portion extraction unit extracts, from a group of words constituting each of the text data pieces, a word that does not match words constituting another of the text data pieces and determines the extracted word as an inherent portion of the text data piece relative to the other text data piece.

(4) With the text mining apparatus described in the above (1), for each word constituting each of the text data pieces, the inherent portion extraction unit calculates the degree to which the word corresponds to an inherent portion of the text data piece relative to another of the text data pieces, using the confidence that has been set for each of the text data pieces, and extracts an inherent portion of the text data piece relative to the other text data piece based on the calculated degree.

(5) With the text mining apparatus described in the above (1), a text data piece generated by speech recognition is used as the text data piece generated by computer processing, the text mining apparatus further including a confidence setting unit that sets confidence for the text data piece generated by speech recognition, using a word graph or an N-best word sequence obtained when performing speech recognition.

(6) The text mining method is for performing text mining using, as targets, a plurality of text data pieces including a text data piece generated by computer processing, the text mining method including the steps of (a) setting confidence for each of the text data pieces, (b) for each of the text data pieces, extracting an inherent portion of the text data piece relative to another of the text data pieces, (c) for each inherent portion of each of the text data pieces relative to another of the text data pieces, setting inherent confidence that indicates confidence of the inherent portion, using the confidence that has been set for each of the text data pieces, and (d) performing text mining on each inherent portion of each of the text data pieces relative to another of the text data pieces, using the inherent confidence.

(7) In the text mining method described in the above (6), in the step (a), a numerical value less than or equal to one is set as the confidence for each of the text data pieces, and in the step (c), in a case of setting the inherent confidence for each inherent portion of one of the text data pieces relative to another of the text data pieces, the inherent confidence is set by multiplying the confidence that has been set for the one text data piece by a value obtained by subtracting the confidence that has been set for the other text data piece from one.

(8) In the text mining method described in the above (6), in the step (b), from a group of words constituting each of the text data pieces, a word that does not match words constituting another of the text data pieces is extracted, and the extracted word is determined as an inherent portion of the text data piece relative to the other text data piece.

(9) In the text mining method described in the above (6), in the step (b), for each word constituting each of the text data pieces, the degree to which the word corresponds to an inherent portion of the text data piece relative to another of the text data pieces is calculated using the confidence that has been set for each of the text data pieces, and an inherent portion of the text data piece relative to the other text data piece is extracted based on the calculated degree.

(10) In the text mining method described in the above (6), a text data piece generated by speech recognition is used as the text data piece generated by computer processing, the text mining method further including the step of setting confidence for the text data piece generated by speech recognition, using a word graph or an N-best word sequence obtained when performing speech recognition.

(11) The computer-readable recording medium records a program for causing a computer device to perform text mining using, as targets, a plurality of text data pieces including a text data piece generated by computer processing, the program including instructions that cause the computer device to perform the steps of (a) setting confidence for each of the text data pieces, (b) for each of the text data pieces, extracting an inherent portion of the text data piece relative to another of the text data pieces, (c) for each inherent portion of each of the text data pieces relative to another of the text data pieces, setting inherent confidence that indicates confidence of the inherent portion, using the confidence that has been set for each of the text data pieces, and (d) performing text mining on each inherent portion of each of the text data pieces relative to another of the text data pieces, using the inherent confidence.

(12) With the computer-readable recording medium described in the above (11), in the step (a), a numerical value less than or equal to one is set as the confidence for each of the text data pieces, and in the step (c), in a case of setting the inherent confidence for each inherent portion of one of the text data pieces relative to another of the text data pieces, the inherent confidence is set by multiplying the confidence that has been set for the one text data piece by a value obtained by subtracting the confidence that has been set for the other text data piece from one.

(13) With the computer-readable recording medium described in the above (11), in the step (b), from a group of words constituting each of the text data pieces, a word that does not match words constituting another of the text data pieces is extracted, and the extracted word is determined as an inherent portion of the text data piece relative to the other text data piece.

(14) With the computer-readable recording medium described in the above (11), in the step (b), for each word constituting each of the text data pieces, the degree to which the word corresponds to an inherent portion of the text data piece relative to another of the text data pieces is calculated using the confidence that has been set for each of the text data pieces, and an inherent portion of the text data piece relative to the other text data piece is extracted based on the calculated degree.

(15) With the computer-readable recording medium described in the above (11), a text data piece generated by speech recognition is used as the text data piece generated by computer processing, and the program further includes an instruction that causes the computer device to perform the step of setting confidence for the text data piece generated by speech recognition, using a word graph or an N-best word sequence obtained when performing speech recognition.

| | Descriptions of Reference Numerals |
|---|---|
| 1 | Text mining apparatus (Exemplary Embodiment 1) |
| 2 | Data input unit |
| 3 | Speech recognition unit |
| 4 | Confidence setting unit |
| 5 | Language processing unit |
| 6 | Inherent portion extraction unit |
| 7 | Inherent confidence setting unit |
| 8 | Mining processing unit |
| 9 | Mining processing management unit |
| 10 | Feature word counting unit |
| 11 | Feature level calculation unit |
| 12 | Mining result output unit |
| 13 | Input device |
| 14 | Output device |
| 15 | Frequency calculation unit |
| 16 | Score calculation unit |
| 17 | Inherent portion determination unit |
| 20 | Text mining apparatus (Exemplary Embodiment 2) |
| 21 | Text mining apparatus (Exemplary Embodiment 3) |
| 22 | Character recognition unit |
| D1(l) | Call audio data |
| D2(l) | Call memo text data |
| D3(l) | Supplementary information |
| D4(l) | Image data |

The invention claimed is:

1. A text mining apparatus for performing text mining using, as targets, a plurality of text data pieces including a text data piece generated by computer processing, confidence being set for each of the text data pieces, the text mining apparatus comprising:
   a processor,
   an inherent portion extraction unit that, for each of the text data pieces, extracts an inherent portion of the text data piece relative to another of the text data pieces using the processor;
   an inherent confidence setting unit that, for each inherent portion of each of the text data pieces relative to another of the text data pieces, sets inherent confidence that indicates confidence of the inherent portion, using the confidence that has been set for each of the text data pieces; and
   a mining processing unit that performs text mining on each inherent portion of each of the text data pieces relative to another of the text data pieces, using the inherent confidence,
   wherein a numerical value less than or equal to one is set as the confidence for each of the text data pieces, and
   in a case of setting the inherent confidence for each inherent portion of one of the text data pieces relative to another of the text data pieces, the inherent confidence setting unit sets the inherent confidence by multiplying the confidence that has been set for the one text data piece by a value obtained by subtracting the confidence that has been set for the other text data piece from one.

2. The text mining apparatus according to claim 1, wherein the inherent portion extraction unit extracts, from a group of words constituting each of the text data pieces, a word that does not match words constituting another of the text data pieces and determines the extracted word as an inherent portion of the text data piece relative to the other text data piece.

3. The text mining apparatus according to claim 1, wherein, for each word constituting each of the text data pieces, the inherent portion extraction unit calculates the degree to which the word corresponds to an inherent portion of the text data piece relative to another of the text data pieces, using the confidence that has been set for each of the text data pieces, and extracts an inherent portion of the text data piece relative to the other text data piece based on the calculated degree.

4. The text mining apparatus according to claim 1,
   wherein a text data piece generated by speech recognition is used as the text data piece generated by computer processing,
   the text mining apparatus further comprising:
   a confidence setting unit that sets confidence for the text data piece generated by speech recognition, using a word graph or an N-best word sequence obtained when performing speech recognition.

5. A text mining method for performing text mining using, as targets, a plurality of text data pieces including a text data piece generated by computer processing, the text mining method comprising the steps of:
   (a) setting confidence for each of the text data pieces;
   (b) for each of the text data pieces, extracting an inherent portion of the text data piece relative to another of the text data pieces;
   (c) for each inherent portion of each of the text data pieces relative to another of the text data pieces, setting inherent confidence that indicates confidence of the inherent portion, using the confidence that has been set for each of the text data pieces; and
   (d) performing text mining on each inherent portion of each of the text data pieces relative to another of the text data pieces, using the inherent confidence,
   wherein in the step (a), a numerical value less than or equal to one is set as the confidence for each of the text data pieces, and
   in the step (c), in a case of setting the inherent confidence for each inherent portion of one of the text data pieces relative to another of the text data pieces, the inherent confidence is set by multiplying the confidence that has been set for the one text data piece by a value obtained by subtracting the confidence that has been set for the other text data piece from one.

6. The text mining method according to claim 5, wherein in the step (b), from a group of words constituting each of the text data pieces, a word that does not match words constituting another of the text data pieces is extracted, and the extracted word is determined as an inherent portion of the text data piece relative to the other text data piece.

7. The text mining method according to claim 5, wherein in the step (b), for each word constituting each of the text data pieces, the degree to which the word corresponds to an inherent portion of the text data piece relative to another of the text data pieces is calculated using the confidence that has been set for each of the text data pieces, and an inherent portion of the text data piece relative to the other text data piece is extracted based on the calculated degree.

8. The text mining method according to claim 5, wherein a text data piece generated by speech recognition is used as the text data piece generated by computer processing, the text mining method further comprising the step of:

setting confidence for the text data piece generated by speech recognition, using a word graph or an N-best word sequence obtained when performing speech recognition.

9. A non-transitory computer-readable recording medium recording a program for causing a computer device to perform text mining using, as targets, a plurality of text data pieces including a text data piece generated by computer processing, the program including instructions that cause the computer device to perform the steps of:

(a) setting confidence for each of the text data pieces;

(b) for each of the text data pieces, extracting an inherent portion of the text data piece relative to another of the text data pieces;

(c) for each inherent portion of each of the text data pieces relative to another of the text data pieces, setting inherent confidence that indicates confidence of the inherent portion, using the confidence that has been set for each of the text data pieces; and (d) performing text mining on each inherent portion of each of the text data pieces relative to another of the text data pieces, using the inherent confidence, wherein in the step (a), a numerical value less than or equal to one is set as the confidence for each of the text data pieces, and in the step (c), in a case of setting the inherent confidence for each inherent portion of one of the text data pieces relative to another of the text data pieces, the inherent confidence is set by multiplying the confidence that has been set for the one text data piece by a value obtained by subtracting the confidence that has been set for the other text data piece from one.

10. The non-transitory computer-readable recording medium according to claim 9, wherein in the step (b), from a group of words constituting each of the text data pieces, a word that does not match words constituting another of the text data pieces is extracted, and the extracted word is determined as an inherent portion of the text data piece relative to the other text data piece.

11. The non-transitory computer-readable recording medium according to claim 9, wherein in the step (b), for each word constituting each of the text data pieces, the degree to which the word corresponds to an inherent portion of the text data piece relative to another of the text data pieces is calculated using the confidence that has been set for each of the text data pieces, and an inherent portion of the text data piece relative to the other text data piece is extracted based on the calculated degree.

12. The non-transitory computer-readable recording medium according to claim 9, wherein a text data piece generated by speech recognition is used as the text data piece generated by computer processing, and the program further includes an instruction that causes the computer device to perform the step of setting confidence for the text data piece generated by speech recognition, using a word graph or an N-best word sequence obtained when performing speech recognition.

* * * * *